3,264,332
6-HALOGENO-1,4,6-PREGNATRIENES AND THE 1,2-DIHYDRO ANALOGS THEREOF
David H. Gould, Leonia, and Elliot L. Shapiro, Irvington, N.J., assignors to Schering Corporation, Bloomfield, N.J., a corporation of New Jersey
No Drawing. Filed Jan. 7, 1959, Ser. No. 785,326
21 Claims. (Cl. 260—397.45)

This invention relates to a novel group of physiologically useful compounds and to processes for their manufacture. More particularly, this invention relates to 6-halogeno-1,4,6-pregnatrienes and the 1,2-dihydro analogs thereof which are more specific in their anti-inflammatory action than previously known anti-inflammatory drugs.

The new compounds of our invention are compounds of the group represented by the following formula:

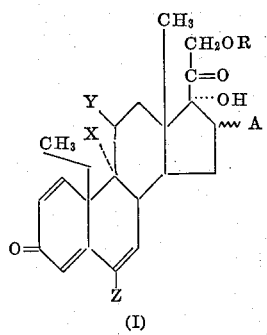

(I)

wherein X is a member of the group consisting of H, and halogen of atomic weight less than 126; Y is a member of the group consisting of O and (H, βOH); Z is a halogen of atomic weight less than 126; R is a member of the group consisting of H and lower alkanoyl; and A is a member of the group consisting of H and lower alkyl; and the 1,2-dihydro analogs thereof.

The alkyl group at the 16-carbon may be in an α or β-position, and may be straight chained or branched and contains preferably from 1 to 4 carbon atoms. Within this group are substituents such as methyl, ethyl, propyl, isopropyl, butyl, t-butyl, and the like.

Illustrative of the 21-esters contemplated above are alkanoates such as acetate, propionate, tertiary butyl acetate, cyclopentylpropionate, dimethylacetate, phenoxyacetate; aryl esters such as benzoate, thiophenecarboxylate, nicotinate; esters from dibasic organic esters such as the succinate, phthalate, and the sulfobenzoates, and those from polybasic inorganic acids such as the sulfate, phosphate, and the like.

The pregnadienes and pregnatrienes falling under Formula I are unique in exhibiting a rather narrow spectrum of cortical activities with a concurrent enhancement of the anti-inflammatory property. We have discovered that these 6-halogenated 6-unsaturated corticoids have physiological properties which have been drastically and unexpectedly modified from the parent 6-dehydrocorticoids.

6-dehydroprednisone acetate is known to be an active anti-arthritic corticosteroid similar to cortisone, both of which cause thymus involution in animals and in both animals and humans cause eosinopenia and liver glycogen deposition as well as a reductiton in inflammation. On the other hand, 6-bromo-6-dehydroprednisone acetate of our invention is devoid of activities other than anti-inflammatory, and thus is valuable in not causing extraneous physiological effects so that full benefit may be derived from the anti-inflammatory activity.

In like manner, the 6-halogeno-4,6-pregnadienes of the above formula are more specific in anti-inflammatory activity than their non-6-halogenated analogs by concomitantly being devoid of extraneous undesirable effects. For example, 6-dehydrocortisone 21-acetate (4,6-pregnadiene-17α,21-diol-3,11,20-trione 21-acetate) is a very weak anti-inflammatory agent as determined in the well known granuloma pouch test, and is considered inactive as an anti-arthritic agent in man. 6-bromo-6-dehydrocortisone acetate, on the other hand, when measured by the granuloma pouch test not only exhibits a specificity of action in exhibiting anti-inflammatory activity alone but also possesses this therapeutic activity in a much greater and effective degree than the non-halogenated analog, having an anti-inflammatory potency of the order of prednisone acetate.

The increase in the anti-inflammatory action of the 6-halogenated-4,6-pregnadienes over that of their non-halogenated counterparts is surprising in view of recent clinical findings (Oliveto et al., J.O.C. 22, 1720 (1957)) which indicate that in the 1,4-pregnadiene series, the metabolic effects in man are considerably diminished by the substitution of a halogen atom for a hydrogen atom at C–4.

While both the 6-halogeno-dienes and trienes of Formula I possess the therapeutic activity described herein, the 6-halogeno dienes have further value as intermediates in the preparation of the pregnatrienes of our invention.

The halogeno-pregnadienes IA are prepared by any of the three general procedures outlined below wherein A, X, Y, Z and R have the same meanings given above, Z' is a halogen and Z" is a halogen of atomic weight less than 36. For purposes of simplicity only the A and B ring structures are drawn whenever the remaining portion of the steroid molecule is unchanged in the designated reaction. The dotted line between the 1 and 2 carbon atoms is to indicate that these procedures are also applicable to the 1-dehydro analogs of the indicated compounds.

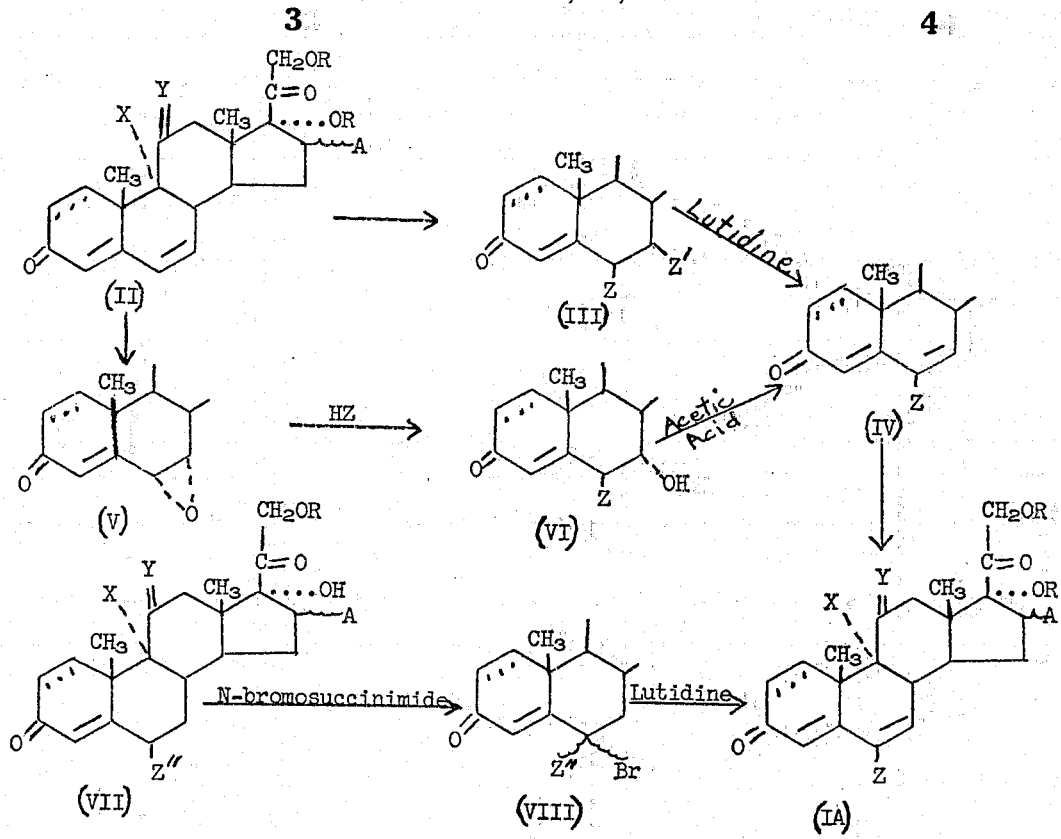

The 4,6-pregnadiene starting compounds II may be prepared directly from the corresponding 4-pregnene 21-acetate by dehydrogenation with an agent such as chloranil in refluxing xylene, or by halogenating 4-pregnene 21-acetates with agents such as N-bromosuccinimide, N-chlorosuccinimide, and the like, followed by subsequent dehydrohalogenation in refluxing collidine or lutidine. Thus, for example, treatment of cortisone 21-acetate with N-bromosuccinimide yields 6-bromocortisone 21-acetate which is dehydrobrominated in refluxing lutidine to yield 6-dehydrocortisone.

In like manner, 4,6-pregnadienes II, wherein A is a lower alkyl group, are obtained from the corresponding 16-alkyl-4-pregnene 21-acetates which are prepared as described by Rausser et al., in their copending application Serial No. 733,843, filed May 8, 1958, now Pat. No. 3,164,618.

The dihalogenated intermediates, III, wherein Z and Z' are identical are obtained from the corresponding 4,6-pregnadienes II by known halogenating procedures, using halogens such as bromine or chlorine. Reagents such as iodine monochloride, gromine monochloride, and the like produce intermediates III, wherein Z and Z' are different. Examples of such intermediates are the 6-chloro-7-iodo and the 6-chloro-7-bromo-4-pregnenes. Mixed dihalogenation may also be accomplished by adding to the 4,6-pregnadienes a series of halogenating reagents under proper conditions. For example, hydrogen fluoride in methylene chloride in admixture with 6-dehydrocortisone 21-acetate followed by addition of N-bromoacetamide in methylene chloride yields 6-fluoro-7-bromo-4-pregnene 21-acetate. Dehydrohalogenation of the 6,7-dihalogeno-4-pregnenes III yields the novel 6-halogeno-4,6-dienes IV by treatment with a base such as collidine, lutidine, dimethylformamide or diethylformamide, with or without the presence of calcium or sodium carbonate for neutralizing the released acid.

An alternative synthesis of compound IV from II is through the 6α-7α-epoxide, V, which is prepared from II by means of a per-acid such as perbenzoic or perphthalic acid. The epoxide V is then converted to the 6-halogeno-7-hydroxy VI through the use of a hydrohalic acid. By dehydrating intermediate VI with such reagents as acetic acid, perchloric acid, or the like, the novel compounds IV are obtained.

In the above procedures, is is preferable, generally, to protect any primary or secondary hydroxyl group which may be present, such as at the 11- or 21-position. This may be accomplished by esterifying the hydroxyl groups in the usual manner or by preservation of the hydroxy in the form of the 9β,11β-epoxide. The Δ$^{4,6}$-6-halogeno esters IV thus formed may be saponified to the free alcohols of Formula IA either chemically by the use of dilute acid or alkali or microbiologically according to procedures described in South African Patent No. 3462/55.

A third route whereby the therapeutically valuable 6-halogeno-4,6-pregnadienes of Formula IA are obtained utilizes as starting compounds 6-halogeno-4-pregnenes of Formula VII which, upon bromination with agents such as bromine, N-bromosuccinimide, or N-bromoacetamide, yields 6-bromo-6-halogeno-4-pregnene intermediates VIII. Subsequent dehydrohalogenation by means of a base such as lutidine or dimethyl formamide converts VIII to a 6-halogeno-4,6-pregnadiene of Formula IA.

Some starting compounds of Formula VII are known, such as the 6-fluoro-9α-halogeno-4-pregnenes and their 1-dehydro analogs.

Other 6-halogeno-4-pregnenes of Formula VII may be prepared from the corresponding 3-keto-4-pregnene by epoxidizing 3-ethylene ketal derivative of a 4-pregnene with a per-acid such as peracetic, perbenzoic and the like to form the 3-ethylene ketal-5α,6α-epoxypregnene intermediate. Upon the addition of a hydrohalic acid such as, for example, hydrochloric to the 5α,6α-epoxy, there is obtained the 6-chloro-3-keto-4-pregnene of the starting compound VII.

The halogenopregnatrienes falling under Formula I are prepared preferably from their 6-halogeno-4,6-pregnadiene analogs. This conversion is effected microbiologically by employing, for example, microorganisms such as *Corynebacterium simplex* (A.T.C.C. 6946) as described in U.S. Patent No. 2,837,464. The dehydrogenation of the A-ring whereby the Δ$^1$-bond is inserted can also be accomplished by known chemical methods such as reacting a 6-halogeno-4,6-pregnadiene with selenium dioxide, or with chloranil at elevated temperatures.

Alternatively, the 6-halogenated pregnatrienes are prepared from the non-6-halogenated pregnatrienes by means of sequences of reactions similar to those whereby the 6-halogeno-4,6-pregnadienes are prepared. Thus, for example, 6-dehydroprednisone acetate is brominated to give 6,7-dibromoprednisone 21-acetate intermediate which, on treatment with a base such as lutidine yields 6-bromo-1,4,6-pregnatriene 21-acetate of our invention.

The 1,4,6-pregnatriene starting compounds, the 1-dehydro analogs of II, may be prepared directly from the corresponding known 1,4-pregnadiene 21-acetates by dehydrogenation with an agent such as chloranil in refluxing xylene; or by the allylic halogenation of a 3-keto-1,4-pregnadiene 21-acetate with agents such as N-bromosuccinimide, N-chlorosuccinimide to form the corresponding 3-keto-6-halogeno-1,4-pregnadiene which is subsequently dehydrohalogenated to refluxing collidine or lutidine.

1,4-pregnadiene compounds containing a 16-alkyl substituent may be prepared as described by Rausser et al., supra. The 16-alkylated-1,4-pregnadienes are then converted to the 16-alkyl-1,4,6-pregnatrienes and thence to the 6-halogeno-pregnatrienes by processes analogous to those indicated above.

When our 6-halogeno-1,4,6-pregnatrienes are prepared according to the third procedure described heretofore, the necessary 6-halogeno-1,4-pregnadiene starting compounds VII may be prepared by epoxidizing a corresponding 1,5-pregnadiene to form a 5α,6α-epoxy-1-pregnene intermediate which, upon the addition of a hydrohalic acid, yields the necessary 6-halogeno-1,4-pregnadiene. Thus, 1,5-pregnadiene-17α,21-diol-3,11,20-trione 21-acetate is reacted with peracetic acid to give 5α,6α-oxido-1-pregnene-17α,21-diol-3,11,20-trione 21-acetate which, upon the addition of hydrogen chloride, yields the desired starting compound 6α-chloroprednisone 21-acetate.

The 1,5-pregnadienes and their 16-alkyl analogs (necessary intermediates for the preparation of the 6-halogeno-1,4-pregnadiene intermediates VII) are described by Nussbaum et al. in copending applications Serial No. 725,521, filed April 1, 1958, now abandoned, and Serial No. 770,-315, filed October 29, 1958, now U.S. Patent No. 3,013,-033, respectively. Intermediates of Formula VII containing a 6-fluoro substituent may also be prepared as described in copending application of Nussbaum et al. Serial No. 770,288 filed October 29, 1958.

In one preferred method, the 9α-halogen atom, and preferably the 9α-fluorine atom is introduced into the 6-halogeno-6-dehydro-4-monoene and 1,4-diene 21-esters as represented, for example, by 6-fluoro-6-dehydrohydrocortisone acetate and 6-fluoro-6-dehydroprednisone acetate, respectively, by first dehydrating 6-fluoro-6-dehydroprednisolone acetate, for example, with an alkyl or arylsulfonyl chloride, e.g. methanesulfonyl chloride, in an organic medium such as pyridine to effect the production of the corresponding $\Delta^{9(11)}$-derivative, i.e. 6-fluoro-1,4,6,9-(11)-pregnatetraene-17α,21 - diol-3,20-dione 21-acetate and, in the case of the monoene, 6-fluoro-4,6,9,(11)-pregnatriene-17α,21-diol-3,20-dione 21 acetate. Placement of a halogen and preferably bromine at the 9α-carbon position is accomplished by conventional means such as, for example, by reacting the $\Delta^{9(11)}$-steroid with hypobromous acid which is preferably prepared in situ by the reaction of combinations such as N-bromoacetamide and perchloric acid yielding directly the corresponding 6-fluoro-9α-bromo-6 - dehydroprednisolone 21-acetate, and 6-fluoro-9α-bromo-6-dehydrohydrocortisone 21-acetate.

An alternative method of introducing a 9α-halogen atom into the 6-fluoro-4,6-pregnadienes and 1,4,6-pregnatrienes of Formula I utilizes as starting compounds the 9α-bromohydrins prepared as above which can be refluxed with mild alkali, such as sodium acetate in methanol to form the corresponding 9β,11β-oxido derivatives, such as 9β,11β-oxido-6-fluoro-6-dehydroprednisolone 21-acetate or 9β,11β-oxido-6-fluoro-6-dehydrohydrocortisone 21-acetate. These latter compounds are then reacted with hydrogen fluoride in chloroform with or without ethanol and/or tetrahydrofuran to cause the formation of 6,9α-difluoro-6-dehydroprednisolone acetate and 6,9α-difluoro-6-dehydrohydrocortisone 21-acetate. Similarly, the substitution of anhydrous hydrogen chloride for hydrogen fluoride in this reaction results in the production of the corresponding 9α-chloro derivatives.

The 9α-halogeno-11β-hydroxy compounds of Formula I thus prepared are readily converted by oxidation to the corresponding ketones by known means such as, for example, with chromium trioxide in pyridine. These compounds are readily hydrolyzed at the C-21 position by microbiological procedures with microorganisms such as *Flavobacterium dehydrogenans* or by using standard hydrolytic agents such as aqueous methanolic potassium bicarbonate, sodium carbonate, concentrated hydrochloric in methanol-chloroform, perchloric acid in methanol or like substances as disclosed herein to prepare the corresponding 21-alcohols.

Our therapeutically valuable 6-halogeno-4,6-pregnadienes and 6-halogeno-1,4,6-pregnatrienes are preferably administered orally in the form of tablets containing for example about 5 to 25 mg. per tablet with a solid carrier containing one or more of the usual excipients such as starch, sugar, gums, soaps, clays and the like. Where parenteral administration is indicated, subcutaneous or intramuscular injection of the substance dissolved or suspended in a suitable non-toxic liquid vehicle is preferred. Parenteral compositions preferably contain a 21-ester of the 6-halo-4,6-pregnadiene or the 1-dehydro analog thereof. In the treatment of skin conditions such as atopic dermatoses, topical preparations such as ointments or creams containing 0.1–5% of active ingredient is advantageously employed. In some instances, microcystalline suspensions are injected intra-articularly. These microcrystalline suspensions are adaptable to nasal sprays as well.

The compounds of our invention which are preferentially utilized as indicated above are 6-fluoro analogs of 6-dehydroprednisone, 6-dehydroprednisolone, 6-dehydrocortisone, 6-dehydrohydrocortisone, and particularly the 9α-fluoro-16-methyl-(α and β)-analogs and their 21-esters.

The following examples are illustrative of the procedures employed in preparing the compounds of this invention but are not to be construed as limiting the scope thereof; the scope of our invention being limited only by the appended claims.

EXAMPLE 1

6-bromo-6-dehydrocortisone 21-acetate

The requisite intermediate, 6,7-dibromo-cortisone 21-acetate, is prepared from 6-dehydrocortisone 21-acetate in the following manner. Four grams of 6-dehydrocortisone acetate are dissolved in 80 ml. of methylene chloride under argon gas and 1.7 g. of bromine in 3 ml. of methylene chloride is added. The solution decolorizes rapidly and is poured into water after two minutes, extracted with methylene chloride, then washed to neutrality with water. The solution is dried over magnesium sulfate, filtered, and evaporated to dryness in vacuo. Hexane is added to the residue and the mixture then re-evaporated to give a solid residue of 6,7-dibromocortisone 21-acetate.

To the dibromide prepared above there is added, under argon gas, 60 ml. of 2,4-lutidine. The mixture is refluxed 20 minutes, cooled, then poured into an excess of dilute sulfuric acid, and the acidic mixture extracted with methylene chloride. The organic solution is washed with water, dried over magnesium sulfate, and evaporated in vacuo. The resulting residue is crystallized from acetone-hexane to yield 6-bromo-6-dehydrocortisone 21-acetate, M.P. 244° C.

EXAMPLE 2

6-bromo-6-dehydrocortisone

Two grams of 6-bromo-6-dehydrocortisone 21-acetate prepared as in Example 1, are dissolved in 70 ml. of 1:2 chloroform-methanol and chilled to 15° C. while argon is bubbled slowly through the solution, and 3.5 ml. of an aqueous 4% solution of sodium hydroxide is then added rapidly with cooling. The mixture is stirred 3 minutes, acidified with 0.4 cc. of acetic acid, then stirred 10 minutes longer. The resulting solution is concentrated to 30 ml., diluted with water and extracted with chloroform. The organic solution is washed to neutrality with water, dried over magnesium sulfate, filtered and evaporated. The resulting residue is crystallized from acetone to give 6-bromo-6-dehydrocortisone. $\lambda$ max.$=298$ m$\mu$ (CH$_3$OH).

EXAMPLE 3

6-bromo-6-dehydrohydrocortisone 21-acetate

The requisite intermediate, 6,7-dibromohydrocortisone 21-acetate is prepared from 5 g. of 6-dehydrohydrocortisone 21-acetate and 2.25 g. of bromine in the manner described in Example 1.

To the resulting dibromide is added 100 ml. of dimethylformamide and the mixture is refluxed 30 minutes. The solution is evaporated in vacuo to a solid residue which is crystallized from acetone to yield 6-bromo-6-dehydrohydrocortisone 21-acetate, $\lambda_{max.}^{Nujol}$ 2.90, 5.66, 5.76, 6.02, 6.20, 6.50, 8.12$\mu$

EXAMPLE 4

6-bromo-6-dehydrohydrocortisone

The 6-bromohydrocortisone of Example 3 (1 g.) is saponified as described in Example 2 with 1.75 ml. of 4% aqueous sodium hydroxide. The crude product is crystallized from aqueous acetone, to yield 6-bromo-6-dehydrohydrocortisone 21-acetate, $\lambda_{max.}^{Nujol}$ 2.89, 2.94, 6.04, 619$\mu$

EXAMPLE 5

6-chloro-6-dehydrocortisone 21-acetate

The requisite intermediate, 6,7-dichlorocortisone 21-acetate, is prepared from 2 g. of 6-dehydrocortisone 21-acetate and 0.38 gram of chlorine in methylene chloride in the manner described in Example 1.

The dichloride prepared above is dissolved in 50 ml. of 2,4,6-collidine and heated for 3 hours at 90-95° C. The reaction mixture is purified, and the product isolated in the manner of Example 1 to give 6-chloro-6-dehydrocortisone 21-acetate which is crystallized from acetone-hexane, $\lambda_{max.}^{MeOH}$ 295 m$\mu$

EXAMPLE 6

6-chloro-6-dehydrocortisone

The 6-chloro-6-dehydrocortisone 21-acetate prepared in Example 5 is saponified in the manner of Example 2 to yield 6-chloro-6-dehydrocortisone.

EXAMPLE 7

6-fluoro-6-dehydrocortisone 21-acetate

The requisite intermediate, 6-fluoro-7-bromocortisone 21-acetate, is prepared in the following manner. Methylene chloride (60 ml.) saturated with hydrogen fluoride is added dropwise at room temperature to a stirred solution of 6-dehydrocortisone 21-acetate (1 g.) and N-bromoacetamide (0.395 g.) in freshly distilled methylene chloride (20 ml.). After the addition is completed, the reaction mixture is stirred for two hours at room temperature. The solution is then diluted with an additional 500 ml. of methylene chloride, washed with water until neutral, dried over magnesium sulfate, filtered, and evaporated to dryness, in vacuo yielding a residue of 6-fluoro-7-bromocortisone 21-acetate. This is used without further purification in the following procedure.

The 6-fluoro-7-bromocortisone 21-acetate is reacted with 2,4-lutidine under argon gas, in the manner of Example 1. The isolated crude product is chromatographed on activated magnesium silicate. The fractions eluted with 50–75% ether-in-hexane are combined and crystallized from acetone-hexane to give 6-fluoro-6-dehydrocortisone 21-acetate, $\lambda$max.$=297$ m$\mu$ (CH$_3$OH).

EXAMPLE 8

6-bromo-6-dehydrohydrocortisone 11,21-diacetate

A. 6-DEHYDROHYDROCORTISONE 11,21-DIACETATE

The requisite intermediate, 6-bromohydrocortisone 11,21-diacetate, is prepared from hydrocortisone 11,21-diacetate (8.9 g.) in one liter of chlorobenzene and one liter of carbon tetrachloride to which is added 3.7 g. of freshly crystallized N-bromosuccinimide under an atmoshere of nitrogen. The refluxing solution is illuminated with an incandescent lamp (RFL No. 2) until the reaction solution is negative to starch iodide paper. The solution is then chilled, washed with water, dried over magnesium sulfate, filtered, and concentrated in vacuo. The resulting residue is substantially 6-bromohydrocortisone 11,21-diacetate.

Without further purification, the 6-bromohydrocortisone 11,21-diacetate prepared above is dissolved in 200 ml. of 2,4-lutidine and refluxed for two hours. The solution is then chilled, poured into ice and water containing enough sulfuric acid to neutralize hte excess lutidine, and extracted with methylene chloride. The organic layer is washed with water, dried over magnesium sulfate, filtered, and concentrated in vacuo. The resulting residue is chromatographed over magnesium silicate. Elution with 40% to 80% ether-in-hexane, and concentration of the eluates yields 6-dehydrohydrocortisone 11,21-diacetate, $\lambda$max.$=281$ (MeOH).

B. 6-BROMO-6-DEHYDROHYDROCORTISONE 11,21-DIACETATE

The requisite intermediate 6,7-dibromohydrocortisone 11,21-diacetate is prepared as follows. To 2.2 g. of above prepared 6-dehydrohydrocortisone 11,21-diacetate dissolved in 80 ml. of methylene chloride under argon, there is added a drop of hydrogen bromide in acetic acid followed by the dropwise addition of 0.85 g. of bromine in 3 ml. of methylene chloride within 45 minutes at room temperature. The reaction solution is then poured into water and extracted with methylene chloride. The organic layer is washed with water, dried over magnesium sulfate, filtered, and evaporated in vacuo to yield 6,7-dibromohydrocortisone 11,21-diacetate.

Without further purification the dibromide-diacetate prepared immediately above is dissolved in 2,4-lutidine (60 ml.) and refluxed for 30 minutes. The reaction mixture is cooled, poured into dilute acid sufficient to neutralize any excess lutidine, and extracted with methylene chloride. The organic solution is washed with water, dried over magnesium sulfate, filtered, and evaporated in vacuo. The residue is crystallized from acetone-hexane to give 6-bromo-6-dehydrohydrocortisone 11,21-diacetate, $\lambda$max.$=298$ m$\mu$ (CH$_3$OH).

EXAMPLE 9

6-bromo-9$\alpha$-fluoro-6-dehydrohydrocortisone

The requisite intermediate, 6,7-dibromo-9$\alpha$-fluorohydrocortisone 21-acetate, is prepared by reacting 9$\alpha$-fluoro-6-dehydrohydrocortisone 21-acetate (2.1 g.) with hydrogen bromide and with bromine (0.85 g.) in the manner of Example 8B. The dibromide thus prepared is further reacted with 60 ml. 2,4-lutidine in the manner of Example 1 to give 6-bromo-9$\alpha$-fluoro-6-dehydrohydrocortisone 21-acetate, $\lambda$max.$=299$ m$\mu$ (CH$_3$OH).

The 21-acetate is hydrolyzed in the manner of Example 2 to give 6-bromo-9$\alpha$-fluoro-6-dehydrohydrocortisone.

EXAMPLE 10

*6-bromo-6-dehydrocortisone 21-n-butyrate*

A. 6-DEHYDROCORTISONE 21-BUTYRATE

In the manner of Example 8A, cortisone 21-butyrate is reacted with N-bromosuccinimide to form the necessary intermediate, 6-bromocortisone 21-butyrate, which in turn, is reacted with 2,4-lutidine to give 6-dehydrocortisone 21-butyrate.

B. 6-BROMO-6-DEHYDROCORTISONE 21-BUTYRATE 6-dehydrocortisone 21-butyrate (2 g.), prepared in Example 10A, is reacted with bromine (0.83 g.) in the manner of Example 8B to yield 6,7-dibromocortisone 21-butyrate.

Without further purification, the dibromo-21-butyrate prepared above is reacted with 60 ml. of 2,4-lutidine in the manner of Example 8B to yield 6-bromo-6-dehydrocortisone 21-butyrate which, is recrystallized from acetone-hexane, $\lambda$max.=298 m$\mu$ (CH$_3$OH).

EXAMPLE 11

*6-chloro-9$\alpha$-bromo-6-dehydrohydrocortisone*

A. 9$\beta$,11$\beta$-EPOXY-17$\alpha$,21-DIHYDROXY-4,6-PREGNADIENE-3,20-DIONE 21-ACETATE The requisite intermediate, 6-bromo-9$\beta$,11$\beta$-epoxy-17$\alpha$,21-dihydroxy-4-pregnene-3,20-dione 21-acetate, is prepared in the manner of Example 8A from 9$\beta$,11$\beta$-epoxy-17$\alpha$,21-dihydroxy-4-pregnene-3,20-dione 21-acetate and N-bromosuccinimide.

The crude 6-bromo-9$\beta$,11$\beta$-epoxy intermediate thus prepared is dissolved in 200 ml. of 2,4-lutidine and reacted in the manner of Example 8A to give 9$\beta$,11$\beta$-epoxy-17$\alpha$,21-dihydroxy-4,6-pregnadiene-3,20-dione 21-acetate.

B. 6-CHLORO-9$\beta$,11$\beta$-EPOXY-17$\alpha$,21-DIHYDROXY-4,6-PREGNADIENE-3,20-DIONE 21-ACETATE 9$\beta$,11$\beta$-epoxy-4,6-pregnadiene (2 g.) prepared in Example 11A is dissolved in methylene chloride and added to a solution of 0.87 g. of iodine monochloride in methylene chloride under argon. After the solution is completely decolorized it is poured into water and extracted with methylene chloride. The organic solvent layer is washed to neutrality with water, dried over magnesium sulfate, filtered, and evaporated in vacuo to yield a solid residue of the requisite intermediate, 6-chloro-7-iodo-9$\beta$,11$\beta$-epoxy-17$\alpha$,21-dihydroxy-4-pregnene 21-acetate.

Without further purification, the 6-chloro-7-iodo-4-pregnene is dissolved in 200 ml. of 2,4-lutidine and refluxed 30 minutes, then evaporated in vacuo to a solid residue which is crystallized from aqueous acetone to yield 6-chloro-9$\beta$,11$\beta$-epoxy-17$\alpha$,21-dihydroxy-4,6-pregnadiene-3,20-dione 21-acetate; $\lambda$ max.=297 m$\mu$ (CH$_3$OH).

C. 6-CHLORO-9$\alpha$-BROMO-6-DEHYDROHYDROCORTISONE 21-ACETATE

One gram of 6-chloro-9$\beta$,11$\beta$-epoxy-17$\alpha$,21-dihydroxy-4,6-pregnadiene 21-acetate (prepared as in Example 11B) is dissolved in 20 ml. carbon tetrachloride and 20 ml. of glacial acetic acid, and 0.63 ml. of 4-Normal hydrobromic acid in acetic acid is added while maintaining a reaction mixture temperature of approximately 15° C. Twenty minutes after the addition is complete, the solution is diluted with 50 ml. of methylene chloride and washed to neutrality with water. The organic solvent layer is dried over magnesium sulfate, filtered, and evaporated in vacuo to a residue which is crystallized and recrystallized from acetone-hexane to give 6-chloro-9$\alpha$-bromo-6-dehydrohydrocortisone 21-acetate, $\lambda$ max.=297 $\mu$ (CH$_3$OH).

D. 6-CHLORO-9$\alpha$-BROMO-6-DEHYDROHYDROCORTISONE

The 21-acetate of Example 11C is hydrolyzed in the manner of Example 30I to give 6-chloro-9$\alpha$-bromo-6-dehydrohydrocortisone.

EXAMPLE 12

*6-bromo-9$\alpha$-chloro-6-dehydrohydrocortisone*

A. 6-BROMO-9$\beta$,11$\beta$-EPOXY-17$\alpha$,21-DIHYDROXY-4,6-PREGNADIENE-3,20-DIONE 21-ACETATE The requisite intermediate, 6,7-dibromo-9$\beta$,11$\beta$-epoxy-17$\alpha$,21-dihydroxy-4-pregnene-3,20-dione 21-acetate, is prepared in the manner of Example 1 from 9$\beta$,11$\beta$-epoxy-17$\alpha$,21-dihydroxy-4,6-pregnadiene-3,20-dione 21-acetate (prepared as in Example 11A) and bromine.

The crude 6,7-dibromide thus prepared is dissolved in 100 ml. of acetone and 4 grams of potassium acetate added. The reaction mixture is refluxed 20 hours, then evaporated to dryness. The resultant residue is triturated with water, filtered, washed further with water, dried, then crystallized from acetone to give 6-bromo-9$\beta$,11$\beta$-epoxy-17$\alpha$,21-dihydroxy-4,6-pregnadiene-3,20-dione 21-acetate, $\lambda$ max.=299 $\mu$ (CH$_3$OH).

B. 6-BROMO-9$\alpha$-CHLORO-6-DEHYDROHYDROCORTISONE 21-ACETATE

A solution of one gram of 6-bromo-9$\beta$-11$\beta$-epoxy-17$\alpha$,21-dihydroxy-4,6-pregnadiene-3,20-dione 21-acetate (prepared in Example 12A) in 20 ml. of freshly distilled chloroform is cooled to −25° C. To this is added 6.3 ml. of a 0.4 normal solution of hydrogen chloride in chloroform also cooled to −25° C. The reaction mixture is allowed to stand at 0° C. for two hours, and is then extracted with water to neutrality. The organic solvent layer is concentrated to dryness and the residue crystallized and recrystallized from acetone to give 6-bromo-9$\alpha$-chloro-6-dehydrohydrocortisone 21-acetate, $\lambda$ max. =298 $\mu$ (CH$_3$OH).

C. 6-BROMO-9$\alpha$-CHLORO-DEHYDROHYDROCORTISONE

The 21-acetate of Example 12B is hydrolyzed in the manner of Example 30I to give 6-bromo-9$\alpha$-chloro-6-dehydrohydrocortisone.

EXAMPLE 13

*6-bromo-9$\alpha$-chloro-6-dehydrocortisone*

1.1 g. of 6-bromo-9$\alpha$-chloro-6-dehydrohydrocortisone, prepared as in Example 12, is dissolved in 50 ml. of acetic acid and 0.2 g. of chromic acid in 5 ml. of water is added at room temperature. After standing for two hours, the solution is diluted with 200 ml. of water. The precipitate which forms is filtered, washed with water, dried, and crystallized from acetone to give 6-bromo-9$\alpha$-chloro-6-dehydrocortisone 21-acetate, $\lambda$ max.=297 $\mu$ (CH$_3$OH).

The 21-acetate is hydrolyzed in the manner of Example 2 to give 6-bromo-9$\alpha$-chloro-6-dehydrocortisone.

EXAMPLE 14

*6-bromo-6-dehydrohydrocortisone 11,21-diacetate 17-propionate*

A. HYDROCORTISONE 11,21-DIACETATE 17-PROPIONATE

Tto 9.0 g. of hydrocortisone 11,21-diacetate is added 450 ml. of propionic acid. The reaction mixture is saturated with argon, and the solution warmed to approximately 85°–90° C. Trifluoroacetic anhydride (90 ml.) is added and the temperature maintained at 85–90° C. for 45 minutes. The reaction solution is cooled, poured into 10 liters of cold water, and allowed to stand for 1 hour. The precipitated organic material is then separated by filtration, washed three times with 50 ml. of water, dried at 60° C., and crystallized from acetone-hexane to give hydrocortisone 11,21-diacetate 17-propionate.

B. 6-DEHYDROHYDROCORTISONE 11,21-DIACETATE 17-PROPIONATE

The requisite intermediate, 6-bromohydrocortisone 11, 21-diacetate 17-propionate, is prepared from 5 g. of the tri-ester of Example 14A and 1.9 g. of n-bromosuccinimide in the manner described in Example 8A. The resultant 6-bromohydrocortisone tri-ester is dehydrobrominated with 2,4-lutidine in the manner of Example 8A and a product isolated which, when crystallized from acetone-hexane, gives 6-dehydrohydrocortisone 11,21-diacetate 17-propionate.

C. 6-BROMO-6-DEHYDROHYDROCORTISONE 11,21-DIACETATE 17-PROPIONATE

In the manner of Example 1, 2.5 g. of the 6-hydrohydrocortisone of Example 14B is reacted with 0.85 g. of bromine to yield a residue of 6,7-dibromohydrocortisone 11,21-diacetate 17-propionate.

This isolated dibromide is dissolved in 2,4-lutidine (60 ml.) and refluxed 45 minutes. The reaction solution is cooled, poured into an excess of dilute acid, and the resultant precipitate extracted with methylene chloride. The organic solvent extracts are combined, washed with water, dried over magnesium sulfate, filtered and evaporated to a residue. This residue is chromatographed on activated magnesium silicate in the fractions collected with 15–60% ether in hexane are crystallized from acetone-hexane to give 6-bromo-6-dehydrohydrocortisone 11,21-diacetate 17-propionate

EXAMPLE 15

6-bromo-6-dehydroprednisone 21-acetate

The requisite intermediate, 6,7-dibromoprednisone 21-acetate, is prepared from 6-dehydroprednisone 21-acetate in the following manner. To a vigorously stirred solution of 1 g. of 6-dehydroprednisone 21-acetate in 350 ml. of methylene chloride, there is added 3 drops of a solution of hydrobromic acid in acetic acid followed by the dropwise addition, over a 35 minute period, of 0.41 g. of bromine in 40 ml. of methylene chloride. The organic solution is then washed with water (50 ml.) sodium carbonate (50 ml.) and again with water. The organic solution is dried over magnesium sulfate, filtered and evaporated to a residue comprising 6,7-dibromoprednisone 21-acetate. This residue is used without further purification in the following procedure.

To the dibromide prepared above, there is added under argon gas 20 ml. of 2,4-lutidine and the mixture is heated at 90–95° C. for 3½ hours. The reaction mixture is then cooled and poured into a slight excess of dilute ice-chilled aqueous sulfuric acid and the acidified mixture is extracted twice with methylene chloride. The organic extracts are combined, washed with water, dried over magnesium sulfate and filtered. The filtrate is evaporated to a small volume (3 ml.) and poured onto a magnesium silicate column (40 g.) saturated with hexane. The fractions eluted with 40–50% of ether in hexane are combined and evaporated to a residue which is crystallized from acetone-hexane to give 6-bromo-6-dehydroprednisone 21-acetate, M.P. 241–242° C., $\lambda$ max. 226 and 309 m$\mu$ ($CH_3OH$).

Alternatively the compound of this example is prepared by dissolving 3 g. of 6-bromo-6-dehydrocortisone 21-acetate (the compound of Example 1) in 160 ml. of t-butanol and 1.7 ml. of acetic acid. Selenium dioxide (1.7 g.) is added and the solution is refluxed under nitrogen for 8 hours. An additional 1.7 g. of selenium dioxide is then added and refluxing is maintained for an additional 11 hours. The solution is then cooled, filtered and evaporated to a residue which is dissolved in 200 ml. of methylene chloride. The organic solution is washed twice with 50 ml. portions of 1 N-sodium hydroxide, twice with 50 ml. portions of water and is then dried over magnesium sulfate, filtered and evaporated to a residue which is chromatographed using magnesium silicate as described in the above alternative procedure to give 6-bromo-6-dehydroprednisone 21-acetate.

(3) A second alternative method for preparing the compound of this example from 6-bromo-6-dehydrocortisone 21-acetate (the compound of Example 1) is by the microbiological oxidation with Corynebacterium simplex (A.T.C.C. 6946) as described in U.S. Patent No. 2,837,464.

From a solution of 30 g. of yeast extract (Difco) in 3.0 l. of tap water containing 13.2 g. of potassium dihydrogen phosphate and 26.4 g. of disodium hydrogen phosphate (pH of the solution 6.9) 27 portions of 100 ml. each are withdrawn, placed in 300 ml. Erlenmeyer flasks and sterilized by autoclaving for 15 minutes at 15 lb. steam pressure (120° C.). After autoclaving and cooling of the broth one ml. of a suspension of Corynebacterium simplex (A.T.C.C. 6946) is placed in each flask. The flasks are then shaken on a shake table at 220 r.p.m. and 36° C. for 24 hours.

Into each of 27 Erlenmeyer flasks are placed 150 mg. of 6-bromo-6-dehydrocortisone 21-acetate. The flasks and contents are then sterilized for 15 minutes at 15 lb. steam pressure (120° C.). To each flask are then added 5.0 ml. of ethanol. The 24-hour bacterial culture is then transferred aseptically and the resulting suspensions are shaken on a shake table at 220 r.p.m. and 36° C. for 48 hours. The final pH is 7.2.

The contents of all the flasks are combined and extracted with a total of 9 l. of chloroform in three equal portions. The combined extracts are then concentrated to a residue which is crystallized from acetone-hexane to give 6-bromo-6-dehydroprednisone 21-acetate, 241–242° C.

EXAMPLE 16

6-bromo-6-dehydroprednisone 6-bromo-6-dehydroprednisone 21-acetate, prepared as in Example 15, is hydrolyzed to the corresponding 21-alcohol with dilute aqueous sodium hydroxide under argon gas in the manner described in Example 2 to give 6-bromo-6-dehydroprednisone.

EXAMPLE 17

6-bromo-6-dehydroprednisolone

The requisite intermediate, 6,7-dibromoprednisolone 21-acetate, is prepared from 6-dehydroprednisolone 21-acetate and bromine in methylene chloride in the manner described in Example 15.

6,7-dibromoprednisolone 21-acetate, prepared as described above, is reacted with 2,4-lutidine in the manner described in Example 15 and the resultant product isolated and purified in the described manner to give 6-bromo-6-dehydroprednisolone 21-acetate.

Alternatively, 6-bromo-6-dehydroprednisolone 21-acetate is prepared by reacting 6-bromo-6-dehydrohydrocortisone 21-acetate (the compound of Example 4) with selenium dioxide under nitrogen and the resultant product isolated and purified as described in the alternative procedure of Example 15.

A second alternative method for preparing 6-bromo-6-dehydroprednisolone 21-acetate is by the microbiological oxidation of 6-bromo-6-dehydrohydrocortisone 21-acetate (the compound of Example 4) with Corynebacterium simplex as described in U.S. Patent No. 2,837,464.

6-bromo-6-dehydroprednisolone 21-acetate is hydrolyzed to the corresponding 21-alcohol with aqueous sodium hydroxide solution in chloroform-methanol as described in Example 2 to give 6-bromo-6-dehydroprednisolone.

EXAMPLE 18

6-bromo-9α-fluoro-6-dehydrocortisone

The requisite intermediate, 6,7-dibromo-9α-fluorocortisone 21-acetate, is prepared by reacting 9α-fluoro-6-dehydrocortisone 21-acetate with hydrogen bromide and bromine in the manner of Example 8B. The dibromide thus prepared is further reacted with 2,4-lutidine in the manner of Example 1 to give 6-bromo-9α-fluoro-6-dehydrocortisone 21-acetate.

6-bromo-9α-fluoro-6-dehydrocortisone 21-acetate is hydrolyzed to the corresponding 21-alcohol by means of dilute aqueous sodium hydroxide in chloroform-methanol in the manner of Example 2 to give 6-bromo-9α-fluoro-6-dehydrocortisone.

Alternatively, 6-bromo - 9α - fluoro-6-dehydrocortisone 21-acetate is prepared as follows:

To a solution of 0.3 g. of 6-bromo-9α-fluoro-6-dehydrohydrocortisone 21-acetate (a compound of Example 9) in 15 ml. of acetic acid there is added dropwise a solution of 60 mg. of chromium trioxide in 1 ml. of water and 3 ml. of acetic acid. The resultant mixture is allowed to stand for 5 hours and then is diluted with water and extracted with methylene chloride. The organic extracts are washed with water, dried over magnesium sulfate, filtered and evaporated to a residue which is crystallized from acetone-hexane to yield 6-bromo-9α-fluoro-6-dehydrocortisone 21-acetate.

EXAMPLE 19

6-bromo-9α-fluoro-6-dehydroprednisone

The requisite intermediate, 6,7-dibromo-9α-fluoroprednisone 21-acetate, is prepared in the manner of Example 15 from 9α-fluoro-6-dehydroprednisone 21-acetate and bromine in methylene chloride.

The 6,7-dibromo-9α-fluoroprednisone 21-acetate prepared as described above is reacted with 2,4-lutidine under argon gas in the manner described in Example 15 to give 6-bromo-9α-fluoro-6-dehydroprednisone 21-acetate.

Alternatively, the 21-acetate of the compound of this example is prepared from 6-bromo-9α-fluoro-6-dehydrocortisone 21-acetate (prepared as in Example 18) by oxidizing with selenium dioxide under nitrogen or by the action of a culture of *Corynebacterium simplex* as described in the alternative methods of Example 15.

6-bromo-9α-fluoro-6-dehydroprednisone 21-acetate, prepared as described above, is hydrolyzed to the corresponding 21-alcohol with dilute aqueous sodium hydroxide in chloroform-methanol in the manner of Example 2 to give 6-bromo-9α-fluoro-6-dehydroprednisone.

EXAMPLE 20

6-bromo-9α-fluoro-6-dehydroprednisolone

The requisite intermediate, 6,7-dibromo-9α-fluoroprednisolone 21-acetate, is prepared by brominating 9α-fluoro-6-dehydroprednisolone 21-acetate in the manner described in Example 15.

6,7-dibromo-9α-fluoroprednisolone 21-acetate is dehydrobrominated with 2,4-lutidine in the manner described in Example 15 to give 6-bromo-9α-fluoro-6-dehydroprednisolone 21-acetate.

Alternatively, the 21-acetate of the compound of this example is prepared by oxidizing 6-bromo-9α-fluoro-6-dehydrohydrocortisone 21-acetate (a compound of Example 9) with selenium dioxide or by the action of a culture of *Corynebacterium simplex* according to the alternate procedures of Example 15 to give 6-bromo-9α-fluoro-6-dehydroprednisolone 21-acetate.

The 21-acetate of the compound of this example is hydrolyzed to the corresponding 21-alcohol with dilute aqueous sodium hydroxide in chloroform-methanol in the manner of Example 2 to give 6-bromo-9α-fluoro-6-dehydroprednisolone.

EXAMPLE 21

6,9α-dibromo-6-dehydroprednisolone

A. 9β,11β-EPOXY-17α,21-DIHYROXY-1,4,6-PREGNATRIENE-3,20-DIONE 21-ACETATE

The requisite intermediate, 6-bromo-9β,11β-epoxy-17α,21-dihydroxy-1,4-pregnadiene-3,20-dione 21-acetate, is prepared in the manner of Example 8A from 9β,11β-epoxy-17α,21-dihydroxy-1,4-pregnadiene-3,20-dione 21-acetate and N-bromosuccinimide.

The 6-bromo-9β,11β-epoxy intermediate thus prepared is dissolved in 200 ml. of 2,4-lutidine and reacted in the manner of Example 8A to give 9β,11β-epoxy-17α,21-dihydroxy-1,4,6-pregnatriene-3,20-dione 21-acetate.

B. 6-BROMO-9β,11β-EPOXY-17α,21-DIHYDROXY-1,4,6-PREGNATRIENE-3,20-DIONE 21-ACETATE

The requisite intermediate, 6,7-dibromo-9β,11β-epoxy-17α,21-dihydroxy-1,4-pregnadiene-3,20-dione 21-acetate, is prepared in the manner of Example 1 by brominating 9β,11β - epoxy-17α,21-dihydroxy-1,4,6-pregnatriene-3,20-dione 21-acetate (the compound of Example 21A).

The 6,7-dibromo-9β,11β-epoxy thus prepared is dissolved in 100 ml. of acetone and 4 g. of potassium acetate added. The reaction mixture is refluxed 20 hours, then evaporated to dryness. The resultant residue is triturated with water, filtered, washed further with water, dried, then crystallized from acetone to give 6-bromo-9β,11β-epoxy-17α,21-dihydroxy-1,4,6-pregnatriene-3,20-dione 21-acetate.

Alternatively, the compound of this example is prepared from 6-bromo-9β,11β-epoxy-17α,21-dihydroxy-4,6-pregnadiene-3,20-dione 21-acetate by the oxidizing action of a culture of *Corynebacterium simplex* according to procedures analogous to those described in U.S. Patent No. 2,837,464.

C. 6,9α-DIBROMO-6-DEHYDROPREDNISOLONE 21-ACETATE

One gram of 6-bromo-9β,11β-epoxypregnatriene, prepared as in Example 21B is dissolved in 20 ml. of carbon tetrachloride and reacted with hydrobromic acid in acetic acid in the manner of Example 11C. The resultant product is isolated and purified in the described manner to give 6,9α-dibromo-6-dehydroprednisolone 21-acetate.

D. 6,9α-DIBROMO-6-DEHYDROPREDNISOLONE

To 240 mg. of the 6,9α-dibromopregnatriene 21-acetate of Example 21C, there is added 10 ml. of a 0.3 Normal solution of methanolic perchloric acid. The solution is left at room temperature for 24 hours, and then diluted with water. A precipitate results which is filtered and crystallized from acetone-hexane to give 6,9α-dibromo-6-dehydroprednisolone.

EXAMPLE 22

6-fluoro-6-dehydroprednisone

A. 6α-FLUOROPREDNISONE 21-ACETATE

A solution of 2 g. of 6α-fluoroprednisone in 10 ml. of pyridine and 10 ml. of acetic anhydride is left at room temperature for fifteen hours. The mixture is then poured into ice and water. A solid separates which is washed with water, filtered, air dried and crystallized from acetone-hexane to give 6α-fluoroprednisone 21-acetate.

B. 6-BROMO-6-FLUOROPREDNISONE 21-ACETATE

To a solution of 2.0 g. of 6α-fluoroprednisone 21-acetate in 250 ml. of carbon tetrachloride and 250 ml. of chlorobenzene under an atmospher of nitrogen there is added 0.92 g. of freshly crystallized N-bromosuccinimide. The refluxing solution is illuminated with an incandescent lamp (RFL No. 2) until the reaction solution is negative to starch iodide paper. The solution is chilled, washed with water, dried over magnesium sulfate, filtered, and concentrated in vacuo to a residue which is crystallized from acetone-hexane to give 6-bromo-6-fluoroprednisone 21-acetate.

C. 6-FLUORO-6-DEHYDROPREDNISONE 21-ACETATE

To 15 ml. of 2,4-lutidine under nitrogen there is added 0.5 g. of 6-bromo-6-fluoroprednisone 21-acetate (the compound of Example 22B). The solution is refluxed for 2 hours, then cooled and poured into an ice-cold water solution containing 10 ml. of sulfuric acid. The reaction mixture is extracted with methylene chloride, the organic extracts are combined, washed with water, dried over magnesium sulfate, filtered and concentrated in vacuo to a residue which is chromatographed over magnesium silicate. The fractions containing 40%–80% ether-in-hexane are combined and concentrated in vacuo to give 6-fluoro-6-dehydroprednisone 21-acetate.

D. 6-FLUORO-6-DEHYDROPREDNISONE

The 21-acetate of Example 22C is hydrolyzed to the corresponding 21-alcohol by means of dilute aqueous sodium hydroxide in the manner described in Example 2 to give 6-fluoro-6-dehydroprednisone.

Alternatively, the compound of this example is prepared as follows. 6-fluoro-6-dehydrocortisone 21-acetate (the compound of Example 7) is subjected to the action of a culture of *Corynebacterium simplex* and the resultant product isolated and purified in a manner similar to that described in Method 3 of Example 15 to give 6-fluoro-6-dehydroprednisone 21-acetate. Hydrolysis of this 21-acetate to the corresponding 21-alcohol in the manner of Example 2 gives 6-fluoro-6-dehydroprednisone.

A second alternative for the preparation of the compound of this example is as follows. 6-dehydroprednisone 21-acetate is reacted with hydrogen fluoride and N-bromoacetamide in methylene chloride in the manner described in Example 7 to give the requisite intermediate, 6-fluoro-7-bromoprednisone 21-acetate.

6-fluoro-7-bromoprednisone 21-acetate is reacted with 2,4-lutidine under argon gas in the manner described in Example 1 to give 6-fluoro-6-dehydroprednisone 21-acetate, which is hydrolyzed in the manner of Example 2 to give 6-fluoro-6-dehydroprednisone.

EXAMPLE 23

*6-chloro-6-dehydroprednisone 21-acetate*

A. 5α,6α-OXIDO-1-PREGNENE-17α,21-DIOL-3,11,20-TRIONE 21-ACETATE

The requisite intermediate, 1,5-pregnadiene-17α,21-diol-3,11,20-trione 21-acetate, is prepared as described in copending application Serial No. 725,521 of Nussbaum et al., filed April 1, 1958, now abandoned.

A solution of 4 g. of 1,5-pregnadiene-17α,21-diol-3,11,20-trione 21-acetate in 600 ml. of benzene is cooled to 6–8° C., and then there is added a solution of 35 ml. of 40% peracetic acid and 3.5 g. of sodium acetate. The mixture is allowed to stand overnight at room temperature. The benzene layer is then separated, washed with dilute sodium hydroxide and water, dried over magnesium sulfate, and evaporated to a residue which is crystallized from acetone-hexane to give 5α,6α-oxido-1-pregnene-17α,21-diol-3,11,20-trione 21-acetate.

B. 6α-CHLOROPREDNISONE 21-ACETATE

5α,6α-oxido-1-pregnene-17α,21-diol-3,11,20 - trione 21-acetate (1.0 g.), the product of Example 23A, is dissolved in 20 ml. of freshly distilled chloroform and chilled to −20° C. and there is added 6.2 ml. of a 0.4 N solution of anhydrous hydrogen chloride in chloroform, also chilled to −20° C. The reaction solution is allowed to stand at 0° C. for 2 hours, then the excess acid is washed free with water. The chloroform layer is dried over magnesium sulfate, filtered, then chilled in an ice-salt bath. The organic solution is saturated with hydrogen chloride for 45 minutes, then is washed neutral with water, dried and evaporated to a residue which is crystallized from methanol-water to give 6α-chloroprednisone 21-acetate.

C. 6-CHLORO-6-BROMOPREDNISONE 21-ACETATE

A solution of 2.0 g. of 6α-chloroprednisone 21-acetate is treated with N-bromosuccinimide and the resultant product isolated and purified in the manner described in Example 22B to give 6-chloro-6-bromoprednisone 21-acetate.

D. 6-CHLORO-6-DEHYDROPREDNISONE 21-ACETATE

In a manner similar to that described in Example 22C, 0.5 g. of the 6-bromo-6-chloroprednisone 21-acetate of Example 23C, is reacted with 15 ml. of 2,4-lutidine at reflux for two hours. The resultant product is isolated and purified in the described manner to give 6-chloro-6-dehydroprednisone 21-acetate.

Alternatively, 6α-chloroprednisone 21-acetate, the compound of Example 23B is prepared as described in the following procedures E, F, G, H, and I.

E. CORTISONE 21-ACETATE 3-ETHYLENE KETAL

A solution of 2 g. of cortisone 21-acetate in 25 ml. of chloroform containing 50 ml. of ethylene glycol and 100 ml. of p-toluenesulfonic acid is concentrated with stirring at atmospheric pressure until the temperature reaches 75° C. The last traces of chloroform are then removed in vacuo. The mixture is cooled, and one ml. of pyridine is added, followed by 150 ml. of 2% aqueous sodium bicarbonate solution. The mixture is extracted with methylene chloride. The organic layer is washed several times with water, dried over magnesium sulfate and evaporated to a residue which is crystallized from acetone-hexane to give cortisone 21-acetate 3-ethylene ketal.

F. 5α,6α-OXIDOPREGNANE-17α,21-DIOL-3,11,20-TRIONE 21-ACETATE 3-ETHYLENE KETAL 850 mg. of the 3-ethylene ketal of Example 23E is dissolved in 15 ml. of chloroform, and there is added 100 mg. of sodium acetate and 1 ml. of 40% peracetic acid. After standing for two hours, the solution is washed with cold dilute sodium hydroxide and water, then dried over magnesium sulfate and evaporated to a residue which is crystallized from acetone-hexane to yield 5α,6α-oxidopregnane-17α,21-diol-3,11,20-trione 21 - acetate 3-ethylene ketal.

G. 6β-CHLOROCORTISONE 21-ACETATE

A solution of 1 g. of the oxido-pregnane prepared in Example 23F in 20 ml. of chloroform is chilled to −20° C. and there is added 6.2 ml. of a 0.4 N solution of anhydrous hydrogen chloride in chloroform also chilled to −20° C. The reaction solution is allowed to stand at 0° C. for two hours, then the excess acid is washed free with water. The chloroform layer is dried over magnesium sulfate and evaporated to a residue. To this residue there is added 50 ml. of acetic acid and 1 ml. of water. The solution is refluxed for two hours, cooled and diluted with water, then extracted with methylene chloride. The organic extracts are combined, washed to neutrality with water, dried over magnesium sulfate, then evaporated to a residue which is crystallized from acetone to give 6β-chlorocortisone 21-acetate.

H. 6α-CHLOROCORTISONE 21-ACETATE

A solution of 100 mg. of the 6β-chlorocortisone 21-acetate of Example 23G in 10 ml. of chloroform is cooled to −10° C., and a stream of anhydrous hydrogen chloride is introduced during a period of 2 hours while maintaining the temperature at −10° C. The chloroform solution is then washed with sodium bicarbonate solution and water, dried over magnesium sulfate, and evaporated to a residue which is crystallized from acetone-hexane to give 6α-chlorocortisone 21-acetate.

I. 6α-CHLOROPREDNISONE 21-ACETATE

6α-chlorocortisone 21-acetate, the compound of Example 23H, is subjected to the action of *Corynebacterium simplex* in the manner described in procedure 3 of Example 15, and the product is isolated in the described manner to give 6α-chloroprednisone 21-acetate.

A third method for the preparation of the compound of this example is by subjecting 6-chloro-6-dehydrocortisone 21-acetate, the compound of Example 5, to the action of *Corynebacterium simplex* in a manner similar to that of procedure 3 of Example 15. The resultant product is isolated and purified in the described manner to give 6α-chloro-6-dehydroprednisone 21-acetate.

EXAMPLE 24

*6-chloro-6-dehydroprednisone*

6-chloro-6-dehydroprednisone 21-acetate, the compound of Example 23, is hydrolyzed to the corresponding 21-alcohol in 1:2 chloroform-methanol by means of dilute aqueous sodium hydroxide in the manner in Example 2 to give 6-chloro-6-dehydroprednisone.

EXAMPLE 25

*6-fluoro-6-dehydroprednisolone*

A. 6α-FLUOROPREDNISOLONE 21-ACETATE

6α-fluoroprednisolone is reacted with acetic anhydride in pyridine and the resultant product isolated and purified in the manner described in Example 22A to give 6α-fluoroprednisolone 21-acetate.

B. 6-BROMO-6-FLUOROPREDNISOLONE 21-ACETATE

To 740 mg. of 6α-fluoroprednisolone 21-acetate, the compound of Example 25A in 95 ml. of dioxane is added under an atmosphere of nitrogen a solution of bromine (330 mg.) in 45 ml. of dioxane at room temperature and with stirring. After the color is discharged, agitation is continued for 15 minutes, and the solution is then poured into 1100 ml. of ice water. A precipitate forms which is filtered, air dried, and crystallized from acetone to give 6-bromo-6-fluoroprednisolone 21-acetate.

C. 6-FLUORO-6-DEHYDROPREDNISOLONE 21-ACETATE 6-bromo-6-fluoroprednisolone 21-acetate, the compound of Example 25B, is reacted with 2,4-lutidine under nitrogen and the resutant product isolated and purified in the manner described in Example 22C to give 6-fluoro-6-dehydroprednisolone 21-acetate.

D. 6-FLUORO-6-DEHYDROPREDNISOLONE

The 21-acetate of Example 25C is hydrolyzed to the corresponding 21-alcohol in 1:2 chloroform-methanol with dilute aqueous sodium hydroxide in the manner described in Example 2 to give 6-fluoro-6-dehydroprednisolone.

EXAMPLE 26

*6,9α-difluoro-6-dehydroprednisolone*

A. 6-BROMO-6,9α-DIFLUOROPREDNISOLONE 21-ACETATE 6,9α-difluoroprednisolone 21-acetate is dissolved in dioxane and reacted with bromine in dioxane and the resultant product isolated and purified in the manner described in Example 25B to give 6-bromo-6,9α-difluoroprednisolone 21-acetate.

B. 6,9α-DIFLUORO-6-DEHYDROPREDNISOLONE 21-ACETATE

The 6-bromo-6,9α-difluoroprednisolone 21-acetate of Example 26A is reacted with 2,4-lutidine under an atmosphere of nitrogen and the resultant product isolated and purified in the manner described in Example 22C to give 6,9α-difluoro-6-dehydroprednisolone 21-acetate.

C. 6,9α-DIFLUORO-6-DEHYDROPREDNISOLONE

The 21-acetate of Example 26B is hydrolyzed to the corresponding 21-alcohol in 1:2 chloroform-methanol with dilute aqueous sodium hydroxide in the manner of Example 2 to give 6,9α-difluoro-6-dehydroprednisolone.

EXAMPLE 27

*6,9α-difluoro-6-dehydroprednisone*

A. 6-BROMO-6,9α-DIFLUOROPREDNISONE 21-ACETATE 6,9α-difluoroprednisone 21-acetate dissolved in carbon tetrachloride and chlorobenzene is reacted with N-bromosuccinimide under nitrogen in the manner described in Example 22B, and the resultant product isolated and purified in the described manner to give 6-bromo-6,9α-difluoroprednisone 21-acetate.

B. 6,9α-DIFLUORO-6-DEHYDROPREDNISONE 21-ACETATE

The 6-bromo-6,9α-difluoroprednisone 21-acetate of Example 27A is reacted with 2,4-lutidine under nitrogen and the resultant product isolated and purified in the manner described in Example 22C to give 6,9α-difluoro-6-dehydroprednisone 21-acetate.

C. 6,9α-DIFLUORO-6-DEHYDROPREDNISONE

The 21-acetate of Example 27B is hydrolyzed to the corresponding 21-alcohol in 1:2 chloroform-methanol with dilute aqueous sodium hydroxide in the manner of Example 2 to give 6,9α-difluoro-6-dehydroprednisone.

Alternatively, the compound of this example is prepared by reacting 6,9α - difluoro-6-dehydroprednisolone 21-acetate, the compound of Example 26B, with chromic acid in acetic acid in the manner described in Example 13.

EXAMPLE 28

*6-fluoro-9α-bromoprednisolone*

A. 6-FLUORO-1,4,6,9(11)-PREGNATETRAENE-17α,21-DIOL-3,20-DIONE 21-ACETATE

Five grams of 6-fluoro-6-dehydroprednisolone 21-acetate, the compound of Example 25C, is dissolved in 20 ml. of dry dimethylformamide and 4 ml. of dry pyridine. The solution is chilled in an ice-bath and to it is added dropwise 2.8 g. of methanesulfonyl chloride which has been diluted to 30 ml. with dimethylformamide. After the addition has been completed, stirring is continued at room temperature for 48 hours. The reaction mixture is then poured into cold dilute sulfuric acid and the precipitate which forms is filtered, air dried and crystallized from methanol to yield 6-fluoro-1,4,6,9(11)-pregnatetraene-17α,21 - diol-3,20-dione 21-acetate.

B. 6-FLUORO-9α-BROMO-6-DEHYDROPREDNISOLONE 21-ACETATE 1.25 g. of the 6-fluoropregnatetraene of Example 28A is dissolved in 19½ ml. of methylene chloride and there is added 38 ml. of t-butyl alcohol as well as a solution of 3 ml. of 72% perchloric acid in 22½ ml. of water and a solution of 0.55 g. of N-bromoacetamide in 9½ ml. of t-butyl alcohol. The solution is stirred ½ hour and a solution of 0.55 g. of sodium sulfite in 30 ml. of water is added, and the mixture concentrated in vacuo to a residue. The residue is dissolved in methylene chloride and chromatographed on a magnesium silicate column, then eluted with ether in hexane. The eluates containing 30–60% ether in hexane are combined and concentrated to a residue which is crystallized from acetone-hexane to give 6-fluoro-9α-bromo-6-dehydroprednisolone 21-acetate.

C. 6-FLUORO-9α-BROMO-6-DEHYDROPREDNISOLONE

The 21-acetate of Example 28B is hydrolyzed to the corresponding 21-alcohol by means of methanolic perchloric acid in the manner of Example 21D to give 6-fluoro-9α-bromo-6-dehydroprednisolone.

EXAMPLE 29

*6-chloro-6-dehydroprednisolone*

A. 5α,6α-OXIDO-1-PREGNENE-11β,17α,21-TRIOL-3,20-DIONE 21-ACETATE

The requisite intermediate, 1,5-pregnadiene-11β,17α,21-triol-3,20-dione 21-acetate, is prepared as described in co-pending application Serial No. 725,521 of Nussbaum et al., filed April 1, 1958, now abandoned.

A solution of 4 g. of 1,5-pregnadiene-11β,17α,21-triol-3,20-dione 21-acetate in 600 ml. of benzene is reacted with 35 ml. of 40% peracetic acid and 3½ g. of sodium acetate and the resultant product is isolated and purified in the manner described in Example 23A to give 5α,6α-oxido-1-pregnene-11β,17α,21-triol-3,20-dione 21-acetate.

B. 6α-CHLOROPREDNISOLONE 21-ACETATE

The 5α,6α-oxido-1-pregnene of Example 29A is dissolved in chloroform and reacted with anhydrous hydrogen chloride in the manner of Example 23B to give 6α-chloroprednisolone 21-acetate.

C. 6-CHLORO-6-BROMOPREDNISOLONE 21-ACETATE

A solution of 2 g. of 6α-chloroprednisolone 21-acetate, the compound of Example 29B, is reacted with bromine in dioxane and the resultant product isolated and purified in the manner described in Example 25B to give 6-chloro-6-bromoprednisolone 21-acetate.

D. 6-CHLORO-6-DEHYDROPREDNISOLONE 21-ACETATE 6-bromo-6-chloroprednisolone 21-acetate, the compound of Example 29C, is reacted with 2,4-lutidine in the manner of Example 22C and the resultant product isolated and purified in the described manner to give 6-chloro-6-dehydroprednisolone 21-acetate.

E. 6-CHLORO-6-DEHYDROPREDNISOLONE

The 21-acetate of Example 29D is hydrolyzed to the corresponding 21-alcohol by means of dilute aqueous sodium hydroxide in the manner of Example 2 to give 6-chloro-6-dehydroprednisolone.

EXAMPLE 30

*6-fluoro-16α-methyl-6-dehydrohydrocortisone*

A. 6-BROMO-6-FLUORO-16α-METHYLHYDROCORTISONE 21-ACETATE

The requisite intermediate, 6α-fluoro-16α-methylhydrocortisone 21-acetate is prepared in the manner described in co-pending application Serial No. 770,288 of Nussbaum et al., filed October 29, 1958.

6α-fluoro-16α-methylprednisolone 21-acetate is reacted with bromine in dioxane under nitrogen and the resultant product isolated and purified as described in Example 25B to give 6-bromo-6-fluoro-16α-methylhydrocortisone 21-acetate.

B. 6-FLUORO-16α-METHYL-6-DEHYDROHYDROCORTISONE 21-ACETATE 6-bromo-6-fluoro-16α-methylhydrocortisone 21-acetate, the compound of Example 30A, is reacted with 2,4-lutidine under an atmosphere of nitrogen and the resultant product isolated and purified in the manner described in Example 22C to give 6-fluoro-16α-methyl-6-dehydrohydrocortisone 21-acetate.

C. 6-FLUORO-16α-METHYL-6-DEHYDROHYDROCORTISONE

The 21-acetate of Example 30B is hydrolyzed to the corresponding 21-alcohol by means of dilute aqueous sodium hydroxide in the manner described in Example 2 to give 6-fluoro-16α-methyl-6-dehydrohydrocortisone.

Alternatively, the compound of this example may be prepared as described in the folowing procedures D, E, F. G. H, and I.

D. 16α-METHYLHYDROCORTISONE TRIACETATE

The requisite intermediate, 16α-methylhydrocortisone 21-acetate, is prepared from 16-pregnene-3α-ol-11,20-dione in the manner described in co-pending application Serial No. 733,843 of Rausser et al., filed May 8, 1958, now U.S. Patent No. 3,164,618.

To 9 g. of 16α-methylhydrocortisone 21-acetate there is added 450 ml. of acetic acid. The reaction mixture is saturated with argon gas and the solution warmed to approximately 85–90° C. Trifluoroacetic anhydride (90 ml.) is added and the temperature maintained at 85–90° C. for 45 minutes. The reaction solution is cooled, poured into 10 l. of cold water and allowed to stand for one hour. A solid precipitates which is filtered, washed three times with water, dried at 60° C. and then crystallized from acetone-hexane to give 16α-methylhydrocortisone triacetate.

E. 6-BROMO-16α-METHYLHYDROCORTISONE TRIACETATE

The triacetate of Example 30D is reacted with N-bromosuccinimide in carbon tetrachloride under an atmosphere of nitrogen and the resultant product isolated and purified in the manner described in Example 8A to give 6-bromo-16α-methylhydrocortisone triacetate.

F. 16α-METHYL-6-DEHYDROHYDROCORTISONE TRIACETATE 6-bromo-16α-methylhydrocortisone triacetate, the compound of Example 30E, is reacted with 2,4-lutidine and the resultant product isolated and purified in the manner described in Example 8A to give 16α-methyl-6-dehydrohydrocortisone triacetate.

G. 6-FLUORO-7-BROMO-16α-METHYLHYDROCORTISONE TRIACETATE

16α-methyl-6-dehydrohydrocortisone triacetate, the compound of Example 30F, is reacted with hydrogen fluoride and N-bromoacetamide in methylene chloride, and the resultant product isolated and purified in the manner described in Example 7 to give 6-fluoro-7-bromo-16α-methylhydrocortisone triacetate.

H. 6-FLUORO-16α-METHYL-6-DEHYDROHYDROCORTISONE TRIACETATE

In the manner of Example 7, 6-fluoro-7-bromo-16α-methylhydrocortisone triacetate is reacted with 2,4-lutidine under argon gas and the resultant product isolated and purified to give 6-fluoro-16α-methyl-6-dehydrohydrocortisone triacetate.

I. 6-FLUORO-16α-METHYL-6-DEHYDROHYDROCORTISONE

The triacetate of Example 30H is hydrolyzed to the corresponding trihydroxy compound with the aid of a culture of *Flavobacterium dehydrogenans* (Rutgers University Collection No. 130).

The culture of the organism is prepared by propagating it in a nutrient agar medium at 30° C. for 24 to 72 hours. During incubation, the inoculated tube is exposed to light with the resultant development of a yellow pigment characteristic of the species. The developed culture is rinsed from an agar slant under sterile conditions into a sterile medium of pH 6.8 and having the following composition:

| | Gm. |
|---|---|
| Yeast extract (Difco) | 10 |
| Potassium phosphate monobasic | 4.48 |
| Sodium phosphate dibasic | 4.68 |
| Tap water to 1 liter. | |

This culture medium has previously been autoclaved, as at 15 lb. pressure, for twenty minutes to obtain aseptic condtions, and cooled. The variant is grown in the medium under constant illumination, using the visible range of the spectrum. The incubation temperature is maintained at about 33° C. and is conducted under aerobic conditions. Aeration is accomplished by agitation and/or blowing air through the culture medium.

After the organism has grown for 12 to 24 hours (or longer, if desired), 100 ml. of the growing culture are introduced into each of ten flasks, and to each flask are added 200 mg. of 6-fluoro-16α-methyl-6-dehydrohydrocortisone triacetate dissolved in a minimum volume of ethanol. The reaction mixtures are then shaken at 30° C. for 12 to 48 hours. The reaction is stopped when paper chromatography indicates that the starting material has been transformed.

The contents of the flasks are combined and extracted with methylene chloride. The extracts are concentrated to a residue which is crystallized from acetone-hexane to give 6-fluoro-16α-methyl-6-dehydrohydrocortisone 21-acetate.

EXAMPLE 31

*6-fluoro-16α-methyl-6-dehydrocortisone*

A. 6-BROMO-6-FLUORO-16α-METHYLCORTISONE 21-ACETATE

The requisite intermediate, 6α-fluoro-16α-methylcortisone 21-acetate, is prepared as described in co-pending application Serial No. 770,288 of Nussbaum et al., filed October 29, 1958.

6α-fluoro-16α-methylcortisone 21-acetate and N-bromosuccinimide are reacted under an atmosphere of nitrogen and the resultant product isolated and purified in the manner described in Example 22B to give 6-bromo-6-fluoro-16α-methylcortisone 21-acetate.

B. 6-FLUORO-16α-METHYL-6-DEHYDROCORTISONE 21-ACETATE

In the manner described in Example 22C, the 6-bromo-6-fluoro-16α-methylcortisone 21-acetate of Example 31A is reacted with 2,4-lutidine and the resultant product isolated and purified to give 6-fluoro-16α-methyl-6-dehydrocortisone 21-acetate.

C. 6-FLUORO-16α-METHYL-6-DEHYDROCORTISONE

The 21-acetate of Example 31B is hydrolyzed to the corresponding 21-alcohol by means of dilute aqueous sodium hydroxide in the manner of Example 2 to give 6-fluoro-16α-methyl-6-dehydrocortisone.

Alternatively, the compound of this example is prepared by reacting 6-fluoro-16α-methyl-6-dehydrocortisone 21-acetate, the compound of Example 30B, with chromium trioxide in acetic acid in the manner described in the alternative procedure of Example 18, and hydrolyzing the resultant 21-acetate with dilute aqueous sodium hydroxide in the manner of Example 2.

EXAMPLE 32

*6-fluoro-16β-methyl-6-dehydrohydrocortisone*

A. 6-BROMO-6-FLUORO-16β-METHYLHYDROCORTISONE 21-ACETATE

The requisite intermediate, 6α-fluoro-16β-methylhydrocortisone 21-acetate, is prepared in the manner described in co-pending application Serial No. 770,288 of Nussbaum et al., filed October 29, 1958.

6α-fluoro-16β-methylhydrocortisone 21-acetate is reacted with bromine in dioxane under nitrogen and the resultant product isolated and purified in the manner described in Example 25B to give 6-bromo-6-fluoro-16β-methylhydrocortisone 21-acetate.

B. 6-FLUORO-16β-METHYL-6-DEHYDROHYDROCORTISONE 21-ACETATE

The 6-bromo-6-fluoro-16β-methylhydrocortisone 21-acetate of Example 32A is reacted with 2,4-lutidine and the resultant product isolated and purified in the manner described in Example 22C to give 6-fluoro-16β-methyl-6-dehydrohydrocortisone 21-acetate.

C. 6-FLUORO-16β-METHYL-6-DEHYDROHYDROCORTISONE

The 21-acetate of Example 32 is hydrolyzed to the corresponding 21-alcohol by means of dilute aqueous sodium hydroxide in the manner of Example 2 to give 6-fluoro-16β-methyl-6-dehydrohydrocortisone.

EXAMPLE 33

*6-fluoro-16β-methyl-6-dehydrocortisone*

A. 6-BROMO-6-FLUORO-16β-METHYLCORTISONE 21-ACETATE

The requisite intermediate, 6α-fluoro-16β-methylcortisone 21-acetate, is prepared in the manner described in co-pending application Serial No. 770,288 of Nussbaum et al., filed October 29, 1958.

6α-fluoro-16β-methylcortisone 21-acetate is reacted with N-bromosuccinimide under nitrogen and the resultant product isolated and purified in the manner described in Example 22B to give 6-bromo-6-fluoro-16β-methylcortisone 21-acetate.

B. 6-FLUORO-16β-METHYL-6-DEHYDROCORTISONE 21-ACETATE

The 6-bromo-6-fluoro-16β-methylcortisone 21-acetate of Example 33A and 2,4-lutidine are reacted under a blanket of nitrogen and the resultant product isolated and purified in the manner described in Example 22C to give 6-fluoro-16β-methyl-6-dehydrocortisone 21-acetate.

C. 6-FLUORO-16β-METHYL-6-DEHYDROCORTISONE

The 21-acetate of Example 33B is hydrolyzed to the corresponding 21-alcohol by means of dilute sodium hydroxide in the manner of Example 2 to give 6-fluoro-16β-methyl-6-dehydrocortisone.

Alternatively, 6-fluoro-16β-methyl-6-dehydrohydrocortisone, the compound of Example 32B, is reacted with chromium trioxide in acetic acid and the resultant product isolated and purified in the manner described in the alternative procedure of Example 18 to give 6-fluoro-16β-methyl-6-dehydrocortisone 21-acetate, which, in turn, is hydrolyzed to the corresponding 21-alcohol by means of dilute aqueous sodium hydroxide in the manner of Example 2.

EXAMPLE 34

*6,9α-difluoro-16α-methyl-6-dehydrohydrocortisone*

A. 6-BROMO-6,9α-DIFLUORO-16α-METHYLHYDROCORTISONE 21-ACETATE

The requisite intermediate, 6,9α-difluoro-16α-methylhydrocortisone 21-acetate, is prepared in the manner described in co-pending application Serial No. 770,288 of Nussbaum et al., filed October 29, 1958.

6,9α-difluoro-16α-methylhydrocortisone 21-acetate is reacted with bromine in dioxane under nitrogen and the resultant product isolated and purified in the manner described in Example 25B to give 6-bromo-6,9α-difluoro-16α-methylhydrocortisone 21-acetate.

B. 6,9α-DIFLUORO-16α-METHYL-6-DEHYDROHYDROCORTISONE 21-ACETATE

The 6-bromo-6,9α-difluoro-4-pregnene of Example 34A is reacted with 2,4-lutidine under nitrogen and the resultant product isolated and purified in the manner described in Example 22C to give 6,9α-difluoro-16α-methyl-6-dehydrohydrocortisone 21-acetate.

C. 6,9α-DIFLUORO-16α-METHYL-6-DEHYDROHYDROCORTISONE

The 21-acetate of Example 34B is hydrolyzed to the corresponding 21-alcohol by means of dilute aqueous sodium hydroxide in the manner of Example 2 to give 6,9α-difluoro-16α-methyl-6-dehydrohydrocortisone.

EXAMPLE 35

*6,9α-difluoro-16α-methyl-6-dehydrocortisone*

A. 6-BROMO-6,9α-DIFLUORO-16α-METHYLCORTISONE 21-ACETATE

The requisite intermediate, 6,9α-difluoro-16α-methylcortisone 21-acetate, is prepared in the manner described in co-pending application Serial No. 770,288 of Nussbaum et al., filed October 29, 1958.

6,9α-difluoro-16α-methylcortisone 21-acetate and N-bromosuccinimide are reacted under nitrogen and the resultant product isolated and purified in the manner described in Example 22B to give 6-bromo-6,9α-difluoro-16α-methylcortisone 21-acetate.

B. 6,9α-DIFLUORO-16α-METHYL-6-DEHYDROCORTISONE 21-ACETATE

The 6-bromo-6,9α-difluoro-4-pregnene of Example 35A is reacted with 2,4-lutidine and the resultant product isolated and purified in the manner described in Example 22C to give 6,9α-difluoro-16α-methyl-6-dehydrocortisone 21-acetate.

C. 6,9α-DIFLUORO-16α-METHYL-6-DEHYDROCORTISONE

The 21-acetate of Example 35B is hydrolyzed to the corresponding 21-alcohol by means of dilute aqueous sodium hydroxide in the manner of Example 2 to give 6,9α-difluoro-16α-methyl-6-dehydrocortisone.

Alternatively, 6,9α-difluoro - 16α-methyl-6-dehydrohydrocortisone 21-acetate, the compound of Example 34B, is reacted with chromium trioxide in acetic acid as described in the alternative procedure of Example 18 and the resultant product isolated and purified to give 6,9α-difluoro-16α-methyl-6-dehydrohydrocortisone 21-acetate, which is hydrolyzed to the corresponding 21-alcohol in the manner described in Example 2 to give 6,9α-difluoro-16α-methyl-6-dehydrocortisone.

EXAMPLE 36

6,9α-difluoro-16β-methyl-6-dehydrohydrocortisone

A. 6-BROMO-6,9α-DIFLUORO-16β-METHYLHYDROCORTISONE 21-ACETATE

The requisite intermediate, 6,9α-difluoro-16β-methylhydrocortisone 21-acetate, is prepared in the manner described in co-pending application Serial No. 770,288 of Nussbaum et al, filed October 29, 1958.

6,9α-difluoro-16β-methylhydocortisone 21-acetate and bromine in dioxane are reacted under an atmosphere of nitrogen and the resultant product isolated and purified in the manner described in Example 25B to give 6-bromo-6,9α-difluoro-16β-methylhydrocortisone 21-acetate.

B. 6,9α-DIFLUORO-16β-METHYL-6-DEHYDROHYDROCORTISONE 21-ACETATE

The 6-bromo-6,9α-difluoro-4-pregnene of Example 36A is reacted with 2,4-lutidine under an atomsphere of nitrogen and the resultant product isolated and purified in the manner described in Example 22C to give 6,9α-difluoro-16β-methyl-6-dehydrohydrocortisone 21-acetate.

C. 6,9α-DIFLUORO-16β-METHYL-6-DEHYDROHYDROCORTISONE

The 21-acetate of Example 36B is hydrolyzed to the corresponding 21-alcohol by means of dilute aqueous sodium hydroxide in the manner of Example 2 to give 6,9α-difluoro-16β-methyl-6-dehydrohydocortisone.

EXAMPLE 37

6,9α-difluoro-16β-methyl-6-dehydrocortisone

A. 6-BROMO-6,9α-DIFLUORO-16β-METHYLCORTISONE 21-ACETATE

The requisite intermediate, 6,9α-difluoro-16β-methylcortisone 21-acetate, is prepared as described in co-pending application Serial No. 770,288 of Nussbaum et al, filed October 29, 1958.

6,9α-difluoro-16β-methylcortisone 21-acetate is reacted with N-bromosuccinimide under an atmosphere of nitrogen and the resultant product isolated and purified in the manner described in Example 22B to give 6-bromo-6,9α-difluoro-16β-methylcortisone 21-acetate.

B. 6,9α-DIFLUORO-16β-METHYL-6-DEHYDROCORTISONE 21-ACETATE

The 6-bromo-6,9α-difluoro-4-pregnene of Example 37A is reacted with 2,4-lutidine under nitrogen and the resultant product isolated and purified in the manner of Example 22C to give 6,9α-difluoro-16β-methyl-6-dehydrocortisone 21-acetate.

C. 6,9α-DIFLUORO-16β-METHYL-6-DEHYDROCORTISONE

The 21-acetate of Example 37B is hydrolyzed to the corresponding 21-alcohol by means of dilute aqueous sodium hydroxide in the manner of Example 2 to give 6,9α-difluoro-16β-methl-6-dehydrocortisone.

Alternatively, 6,9α-difluoro - 16β-methyl-6-dehydrohydrocortisone 21-acetate and chromium trioxide in acetic acid are reacted and the resultant product isolated and purified in the manner described in the alternative procedure of Example 18 to give 6,9α-difluoro-16β-methyl-6-dehydrocortisone 21-acetate, which is hydrolyzed to the corresponding 21-alcohol by means of dilute aqueous sodium hydroxide in the manner of Example 2 to give 6,9α-difluoro-16β-methyl-6-dehydrocortisone.

EXAMPLE 38

6-bromo-16α-methyl-6-dehydrohydrocortisone

A. 6,7-DIBROMO-16α-METHYLHYDROCORTISONE TRIACETATE

In the manner described in Example 1, 16α-methyl-6-dehydrohydrocortisone triacetate, the compound of Example 30F, is brominated and the resultant product isolated and purified to give 6,7-dibromo-16α-methylhydrocortisone triacetate.

B. 6-BROMO-16α-METHYL-6-DEHYDROHYDROCORTISONE TRIACETATE 6,7-dibromo-16α-methylhydrocortisone triacetate, the compound of Example 38A, is reacted with 2,4-lutidine and the resultant product isolated and purified in the manner described in Example 1 to give 6-bromo-16α-methyl-6-dehydrohydrocortisone triacetate.

C. 6-BROMO-16α-METHYL-6-DEHYDROHYDROCORTISONE

In the manner described in Example 30I, the triacetate of Example 38B is hydrolyzed to the corresponding alcohol with the aid of a culture of *Flavobacterium dehydrogenans* and the resultant product isolated and purified to give 6-bromo-16α-methyl-6-dehydrohydrocortisone.

EXAMPLE 39

6-chloro-16α-methyl-6-dehydrohydrocortisone

A. 6,7-DICHLORO-16α-METHYLHYDROCORTISONE TRIACETATE

16α-methyl-6-dehydrohydrocortisone triacetate, the compound of Example 30F, is chlorinated and the resultant product isolated and purified in the manner described in Example 5 to give 6,7-dichloro-16α-methylhydrocortisone triacetate.

B. 6-CHLORO-16α-METHYL-6-DEHYDROHYDROCORTISONE TRIACETATE

The 6,7-dichloro-4-pregnene of Example 39A is reacted with 2,4,6-collidine and the resultant product isolated and purified in the manner described in Example 5 to give 6-chloro - 16α-methyl-6-dehydrohydrocortisone triacetate.

C. 6-CHLORO-16α-METHYL-6-DEHYDROHYDROCORTISONE

The triacetate of Example 39B is subjected to the action of a culture of *Flavobacterium dehydrogenans* and the resultant product isolated and purified in the manner described in Example 30I to give 6-chloro-16α-methyl-6-dehydrohydrocortisone.

EXAMPLE 40

6-bromo-16β-methyl-6-dehydrohydrocortisone

A. 16β-METHYLHYDROCORTISONE TRIACETATE

The requisite intermediate, 16β-methylhydrocortisone, is prepared in the manner described in co-pending application Serial No. 733,843 of Rausser et al, filed May 8, 1958, now U.S. Patent No. 3,164,618.

16β-methylhydrocortisone is reacted with acetic acid and trifluoroacetic anhydride in the manner described in Example 30D and the resultant product isolated and purified in the described manner to give 16β-methylhydrocortisone triacetate.

B. 6-BROMO-16β-METHYLHYDROCORTISONE TRIACETATE

16β-methylhydrocortisone triacetate, the compound of Example 40A is reacted with N-bromosuccinimide in carbon tetrachloride under an atmosphere of nitrogen and the resultant product isolated and purified in the manner described in Example 8A to give 6-bromo-16β-methylhydrocortisone triacetate.

C. 16β-METHYL-6-DEHYDROHYDROCORTISONE TRIACTATE 6-bromo-16β-methylhydrocortisone triacetate, the compound of Example 40B is reacted with 2,4-lutidine and the resultant product isolated and purified in the manner described in Example 8A to give 16β-methyl-6-dehydrohydrocortisone triacetate.

D. 6,7-DIBROMO-16β-METHYLHYDROCORTISONE TRIACETATE

16β - methyl - 6 - dehydrohydrocortisone triacetate, the compound of Example 40C, is brominated and the resultant product isolated and purified in the manner described in Example 1 to give 6,7-dibromo-16β-methylhydrocortisone triacetate.

E. 6-BROMO-16β-METHYL-6-DEHYDROHYDROCORTISONE TRIACETATE

The 6,7-dibromo-4-pregnene of Example 40D is reacted with 2,4-lutidine and the resultant product isolated and purified in the manner of Example 1 to give 6-bromo-16β-methyl-6-dehydrohydrocortisone triacetate.

F. 6-BROMO-16β-METHYL-6-DEHYDROHYDROCORTISONE

The triacetate of Example 40E is hydrolyzed to the corresponding alcohol with the aid of a culture of *Flavobacterium dehydrogenans* and the resultant product isolated and purified in the manner of Example 30I to give 6-bromo-16β-methyl-6-dehydrohydrocortisone.

EXAMPLE 41

*6-bromo-16α-methyl-6-dehydrohydrocortisone 21-Acetate*

To 1 g. of 6-bromo-16α-methyl-6-dehydrohydrocortisone, the compound of Example 38, there is added 0.5 ml. of acetic anhydride in 2.3 ml. of pyridine. After standing for one hour at room temperature, the mixture is poured into ice and hydrochloric acid. A precipitate results which is filtered and crystallized from aqueous methanol to yield 6-bromo-16α-methyl-6-dehydrohydrocortisone 21-acetate.

By using propionic anhydride instead of acetic anhyride in the above procedure, there is prepared 6-bromo-16α - methyl - 6 - dehydrohydrocortisone 21 - propionate. Likewise, by substituting any lower alkanoic acid anhydride in the above procedure the corresponding 21-lower alkanoate is formed.

In a similar fashion, the compounds of Examples 39 and 40 are converted to their 21-esters by reaction of the triol with a lower alkanoic acid anhydride and pyridine.

EXAMPLE 42

*6-bromo-16 -methyl-6-dehydrocortisone 21-acetate*

6 - bromo-16α-methyl-6-dehydrohydrocortisone 21-acetate, prepared as described in Example 41, is reacted with chromium trioxide in acetic acid in the manner described in the alternative procedure of Example 18 to give 6-bromo-16α-methyl-6-dehydrocortisone 21-acetate.

In a similar fashion, 6-chloro-16α-methyl-6-dehydrohydrocortisone 21-acetate and 6-bromo-16β-methyl-6-dehydrohydrocortisone 21-acetate are oxidized by means of chromium trioxide to the corresponding 11-keto compounds to give 6-chloro-16α-methyl-6-dehydrocortisone 21-acetate and 6-bromo-16β-methyl-6-dehydrocortisone 21-acetate.

EXAMPLE 43

*6,9α-Dibromo-16α-methyl-6-dehydrohydrocortisone*

A. 6-BROMO-16α-METHYL-4,6,9(11)-PREGNATRIENE-17α,21-DIOL-3,20-DIONE 21-ACETATE

Five grams of 6-bromo-16α-methyl-6-dehydrohydrocortisone 21-acetate, prepared as described in Example 41, is reacted with methanesulfonyl chloride in dimethylformamide and the resultant product isolated and purified in the manner described in Example 28A to give 6-bromo-16α - methyl - 4,6,9(11) - pregnatriene - 17α,21-diol-3,20-dione 21-acetate.

B. 6,9α-DIBROMO-16α-METHYL-6-DEHYDROHYDROCORTISONE 21-ACETATE

To a suspension of 0.3 g. of the 6-bromopregnatriene of Example 43A in 30 ml. of purified dioxane there is added 3 ml. of water containing 0.15 g. of N-bromoacetamide and 1½ ml. of 1.5 N-perchloric acid. The suspension is gently agitated for a period of two hours during which time the mixture becomes homogeneous. A solution of 0.3 g. of sodium sulfite in 3 ml. of water is then added and the reaction mixture is extracted with methylene chloride. The organic extracts are combined, washed with water, dried over magnesium sulfate, filtered and evaporated to a residue which is crystallized from acetone-hexane to give 6,9α-dibromo-16α-methyl-6-dehydrohydrocortisone 21-acetate.

C. 6,9α-DIBROMO-16α-METHYL-6-DEHYDROHYDROCORTISONE

The 21-acetate of Example 43B is hydrolyzed to the corresponding 21-alcohol by means of methanolic perchloric acid in the manner of Example 21D to give 6,9α-dibromo-16α-methyl-6-dehydrohydrocortisone.

Similarly, by procedures analogous to those described in this example 6-bromo-16β-methyl-6-dehydrohydrocortisone 21-acetate, prepared as described in Example 41, is converted to 6-bromo-16β-methyl-4,6,9(11)-pregnatriene-17α,21-diol-3,20-dione 21-acetate and thence to 6,9α-dibromo - 16β - methyl-6-dehydrohydrocortisone 21-acetate which is hydrolyzed to the corresponding 21-alcohol to give 6,9α-dibromo-16β-methyl-6-dehydrohydrocortisone.

EXAMPLE 44

*6-bromo-9α-chloro-16α-methyl-6-dehydrohydrocortisone*

A. 6-BROMO-9β,11β-OXIDO-16α-METHYL-4,6-PREGNADIENE-17α,21-DIOL-3,20-DIONE 21-ACETATE

To 0.3 g. of 6,9α-dibromo-16α-methyl-6-dehydrohydrocortisone 21-acetate, the compound of Example 43B, in 20 ml. of methanol there is added 0.3 g. of potassium acetate. The mixture is refluxed for two hours then concentrated in vacuo to a residue. Water is added to the residue and a solid separates which is filtered and crystallized from methanol-water to give 6-bromo-9β,11β-oxido - 16α-methyl-4,6-pregnadiene-17α,21-diol-3,20-dione 21-acetate.

B. 6-BROMO-9α-CHLORO-16α-METHYL-6-DEHYDROHYDROCORTISONE 21-ACETATE

The 6-bromo-9,11-epoxypregnadiene of Example 44A is reacted with a solution of hydrogen chloride in chloroform and the resultant product isolated and purified in the manner described in Example 12B to give 6-bromo-9α-chloro-16α-methyl - 6 - dehydrohydrocortisone 21-acetate.

C. 6-BROMO-9α-CHLORO-16α-DEHYDROHYDROCORTISONE

The 21-acetate of Example 44B is hydrolyzed to the corresponding 21-alcohol by means of methanolic perchloric acid in the manner of Example 21D to give 6-bromo-9α-chloro-16α-methyl-6-dehydrohydrocortisone.

In a similar fashion, by using the procedures described in this example 6,9α-dibromo-16β-methyl-6-dehydrohydrocortisone 21-acetate, prepared in the manner described in Example 43 is converted to 6-bromo-9β,11β-oxido-16β-methyl-4,6-pregnadiene-17α,21-diol-3,20-dione 21-acetate and thence to 6-bromo-9α-chloro-16β-methyl-6-dehydrohydrocortisone 21-acetate which may be hydrolyzed to the corresponding 21-alcohol by means of methanolic perchloric acid.

EXAMPLE 45

*6,9α-dibromo-16α-methyl-6-dehydrocortisone*

6,9α-dibromo - 16α - methyl-6 - dehydrohydrocortisone, prepared as in Example 43B, is reacted with chromium trioxide in acetic acid in the manner described in the alternative procedure of Example 18 to give 6,9α-dibromo-16α-methyl-6-dehydrocortisone 21-acetate.

The 21-acetate is converted to the corresponding 21-alcohol by means of dilute aqueous sodium hydroxide in the manner of Example 2 to give 6,9α-dibromo-16α-methyl-6-dehydrocortisone.

In like manner, 6,9α-dibromo-16β-methyl-6-dehydrohydrocortisone 21-acetate, prepared as described in Example 43, is oxidized by means of chromium trioxide to 6,9α-dibromo-16β-methyl-6 - dehydrocortisone 21-acetate which is then hydrolyzed to the correspond 21-alcohol.

EXAMPLE 46

*6-bromo-9α-chloro-16α-methyl-6-dehydrocortisone*

6-bromo-9α-chloro-16α - methyl - 6 - dehydrohydrocortisone 21-acetate, the compound of Example 44B, is reacted with chromium trioxide in acetic acid in the manner described in the alternative procedure of Example 18 to give 6 - bromo - 9α-chloro-16α-methyl-6-dehydrocortisone 21-acetate.

The 21-acetate is converted to the corresponding 21-alcohol by means of dilute aqueous sodium hydroxide in the manner of Example 2 to give 6-bromo-9α-chloro-16α-methyl-6-dehydrocortisone.

In like manner, 6-bromo-9α-chloro-16β-methyl-6-dehydrohydrocortisone 21-acetate, prepared as described in Example 44, is oxidized to 6-bromo-9α-chloro-16β-methyl-6-dehydrocortisone 21-acetate and is then saponified to the corresponding 21-alcohol.

EXAMPLE 47

*6-chloro-16α-ethyl-6-dehydrohydrocortisone*

A. 6-BROMO-16α-ETHYLHYDROCORTISONE TRIACETATE

The requisite intermediate, 16α-ethylhydrocortisone 21-acetate, is prepared from hydrocortisone 21-acetate in the manner described in co-pending application Serial No. 733,843 of Rausser et al., filed May 8, 1958, now U.S. Patent No. 3,164,618.

16α-ethylhydrocortisone 21-acetate is reacted with acetic acid and trifluoroacetic anhydride in the manner described in Example 28D to give 16α-ethylhydrocortisone triacetate.

16α-ethylhydrocortisone triacetate is reacted with N-bromosuccinimide in carbon tetrachloride under an atmosphere of nitrogen and the resultant product isolated and purified in the manner described in Example 8A to give 6-bromo-16α-ethylhydrocortisone triacetate.

B. 16α-ETHYL-6-DEHYDROHYDROCORTISONE TRIACETATE 6-bromo-16α-ethylhydrocortisone triacetate, the compound of Example 47A is reacted with 2,4-lutidine and the resultant product isolated and purified in the manner described in Example 8A to give 16α-ethyl-6-dehydrohydrocortisone triacetate.

C. 6,7-DICHLORO-16α-ETHYLHYDROCORTISONE TRIACETATE

16α-ethyl-6-dehydrohydrocortisone triacetate, the compound of Example 47B, is chlorinated and the resultant product isolated and purified in the manner described in Example 5 to give 6,7-dichloro-16α-ethylhydrocortisone triacetate.

D. 6-CHLORO-16α-ETHYL-6-DEHYDROHYDROCORTISONE TRIACETATE

The 6,7-dichloro-4-pregnene of Example 47C is reacted with 2,4,6-collidine and the resultant product isolated and purified in the manner described in Example 5 to give 6-chloro-16α-ethyl-6-dehydrohydrocortisone triacetate.

E. 6-CHLORO-16α-ETHYL-6-DEHYDROHYDROCORTISONE

The triacetate of Example 47D is subjected to the action of a culture of *Flavobacterium dehydrogenans* and the resultant product isolated and purified in the manner described in Example 30I to give 6-chloro-16α-ethyl-6-dehydrohydrocortisone.

EXAMPLE 48

*6-fluoro-16β-n-butyl-6-dehydrocortisone*

A. 6-BROMO-16β-n-BUTYLCORTISONE 21-ACETATE

The requisite intermediate, 16β-n-butylcortisone 21-acetate, is prepared in the manner described in co-pending application Serial No. 733,843 of Rausser et al., filed May 8, 1958, now U.S. Patent No. 3,164,618.

16β-n-butylcortisone 21-acetate is reacted with N-bromosuccinimide in the manner described in Example 8A to give 6-bromo-16β-n-butylcortisone 21-acetate.

B. 16β-n-BUTYL-6-DEHYDROCORTISONE 21-ACETATE

The 6-bromo-16β-n-butylcortisone 21-acetate of Example 48A is reacted with 2,4-lutidine and the resultant product isolated and purified in the manner described in Example 8A to give 16β-n-butyl-6-dehydrocortisone 21-acetate.

C. 6-FLUORO-7-BROMO-16β-n-BUTYLCORTISONE 21-ACETATE

16β-n-butyl-6-dehydrocortisone 21-acetate is reacted with hydrogen fluoride and N-bromoacetamide in methylenechloride and the resultant product isolated and purified in the manner described in Example 7 to give 6-fluoro-7-bromo-16β-n-butylcortisone 21-acetate.

D. 6-FLUORO-16β-n-BUTYL-6-DEHYDROCORTISONE 21-ACETATE

In the manner described in Example 1, the 6-fluoro-7-bromo-16β-n-butylcortisone 21-acetate of Example 48C is reacted with 2,4-lutidine over argon gas and the resultant product isolated and purified to give 6-fluoro-16β-n-butyl-6-dehydrocortisone 21-acetate.

E. 6-FLUORO-16β-n-BUTYL-6-DEHYDROCORTISONE

The 21-acetate of Example 48D is hydrolyzed to the corresponding 21-alcohol by means of dilute aqueous sodium hydroxide in the manner of Example 2 to give 6-fluoro-16β-n-butyl-6-dehydrocortisone.

EXAMPLE 49

*6-fluoro-16α-methyl-6-dehydroprednisolone*

A. 6-BROMO-6-FLUORO-16α-METHYLPREDNISOLONE 21-ACETATE

The requisite intermediate, 6β-fluoro-16β-methylprednisolone 21-acetate, is prepared in the manner described in co-pending application Serial No. 770,288 of Nussbaum et al., filed October 29, 1958.

6α-fluoro-16α-methylprednisolone 21-acetate is reacted with bromine in dioxane under an atmosphere of nitrogen and the resultant product isolated and purified in the manner described in Example 25B to give 6-bromo-6-fluoro-16α-methylprednisolone 21-acetate.

B. 6-FLUORO-16α-METHYL-6-DEHYDROPREDNISOLONE 21-ACETATE

In the manner described in Example 22C, the 6-bromo-6-fluoro-1,4-pregnadiene of Example 49A is reacted with 2,4-lutidine under nitrogen and the resultant product isolated and purified in the described manner to give 6-fluoro-16α-methyl-6-dehydroprednisolone 21-acetate.

C. 6-FLUORO-16α-METHYL-6-DEHYDROPREDNISOLONE

The 21-acetate of Example 49B is converted to the corresponding 21-alcohol by means of dilute aqueous sodium hydroxide in the manner described in Example 2 to give 6-fluoro-16α-methyl-6-dehydroprednisolone.

Alternatively, 6-fluoro-16α-methyl-6-dehydrohydrocortisone, compound of Example 25, is subjected to the action of a culture of *Corynebacterium simplex* and the resultant product isolated and purified in the manner described in the third procedure of Example 15 to give 6-fluoro-16α-methyl-6-dehydroprednisolone.

EXAMPLE 50

*6-fluoro-16β-methyl-6-dehydroprednisolone*

A. 6-BROMO-6-FLUORO-16β-METHYLPREDNISOLONE 21-ACETATE

The requisite intermediate, 6α-fluoro-16β-methylprednisolone 21-acetate, is prepared in the manner described in co-pending application Serial No. 770,288 of Nussbaum et al., filed October 29, 1958.

6α-fluoro-16β-methylprednisolone 21-acetate is reacted with bromine in dioxane in the manner described in Example 25B and the resultant product isolated and purified to give 6-bromo-6-fluoro - 16β - methylprednisolone 21-acetate.

B. 6-FLUORO-16β-METHYL-6-DEHYDROPREDNISOLONE 21-ACETATE

The 6-bromo-6-fluoropregnadiene of Example 50A is reacted with 2,4-lutidine and the resultant product isolated and purified in the manner described in Example 22C to give 6-fluoro - 16β - methyl - 6 - dehydroprednisolone 21-acetate.

C. 6-FLUORO-16β-METHYL-6-DEHYDROPREDNISOLONE

The 21-acetate of Example 50B is hydrolyzed to the corresponding 21-alcohol by means of dilute aqueous sodium hydroxide in the manner of Example 2 to give 6-fluoro-16β-methyl-6-dehydroprednisolone.

Alternatively, 6-fluoro-16β-methyl-6-dehydrohydrocortisone, the compound of Example 32, is subjected to the action of a culture of *Corynebacterium simplex* and the resultant product isolated and purified in the manner described in procedure 3 of Example 15 to give 6-fluoro-16β-methyl-6-dehydroprednisolone.

EXAMPLE 51

*6-fluoro-16α-methyl-6-dehydroprednisone*

A. 6-FLUORO-16α-METHYL-6-DEHYDROPREDNISONE 21-ACETATE 6-fluoro-16α-methyl-6-dehydroprednisolone 21-acetate, the compound of Example 48B, is reacted with chromium trioxide and acetic acid and the resultant product isolated and purified in the alternative procedure of Example 18 to give 6-fluoro - 16α - methyl-6-dehydroprednisone 21-acetate.

B. 6-FLUORO-16α-METHYL-6-DEHYDROPREDNISONE

The 21-acetate of Example 51A is hydrolyzed to the corresponding 21-alcohol by means of dilute aqueous sodium hydroxide in the manner of Example 2 to give 6-fluoro-16α-methyl-6-dehydroprednisone.

Alternatively, by means of the sequence of reactions described in Example 49, 6α-fluoro - 16α - methylprednisone 21-acetate is reacted with N-bromosuccinimide to obtain the 6-bromo-6-fluoro intermediate which is then reacted with 2,4-lutidine to give 6-fluoro-16α-methyl-6-dehydroprednisolone 21-acetate.

EXAMPLE 52

*6-fluoro-16β-methyl-6-dehydroprednisone*

A. 6-FLUORO-16β-METHYL-6-DEHYDROPREDNISONE 21-ACETATE 6-fluoro-16β-methyl-6-dehydroprednisolone 21-acetate, the compound of Example 50B is reacted with chromium trioxide in acetic acid and the resultant product isolated and purified in the manner described in the alternative procedure of Example 18 to give 6-fluoro-16β-methyl-6-dehydroprednisone 21-acetate.

B. 6-FLUORO-16β-METHYL-6-DEHYDROPREDNISONE

The 21-acetate of Example 52A is converted to the corresponding 21-alcohol by means of dilute aqueous sodium hydroxide in the manner described in Example 2 to give 6-fluoro-16β-methyl-6-dehydroprednisone.

Alternatively, in the manner described in the sequence of reactions in Example 50, 6α-fluoro-16β-methylprednisone 21-acetate, prepared as described in copending application Serial No. 770,288 of Nussbaum et al., filed October 29, 1958 is first reacted with N-bromosuccinimide and then with 2,4-lutidine to give 6-fluoro-16β-methyl-6-dehydroprednisone 21-acetate.

EXAMPLE 53

*6-fluoro-9α-bromo-16α-methyl-6-dehydroprednisolone*

A. 6-FLUORO-16α-METHYL-1,4,6,9(11)-PREGNATETRAENE-17α,21-DIOL-3,20-DIONE 21-ACETATE 6-fluoro-16α-methyl-6-dehydroprednisolone 21-acetate, the compound of Example 49B, is reacted with methylene sulfonyl chloride in dimethylformamide and the resultant product isolated and purified in the manner described in Example 28A to give 6-fluoro-16α-methyl-1,4,6,9(11)-pregnatetraene-17α,21-diol-3,20-dione 21-acetate.

C. 6-FLUORO-9α-BROMO-16α-METHYL-6-DEHYDROPREDNISOLONE 21-ACETATE

In the manner described in Example 28B the 6-fluoropregnatetraene of Example 53A is reacted with perchloric acid and N-bromoacetamide, and the resultant product isolated and purified to give 6-fluoro-9α-bromo-16α-methyl-6-dehydroprednisolone 21-acetate.

C. 6-FLUORO-9α-BROMO-16α-METHYL-6-DEHYDROPREDNISOLONE

The 21-acetate of Example 53B is hydrolyzed to the corresponding 21-alcohol with methanolic perchloric acid in the manner of Example 21D to give 6-fluoro-9α-bromo-16α-methyl-6-dehydroprednisolone.

EXAMPLE 54

*6,9α-difluoro-16α-methyl-6-dehydroprednisolone*

A. 6-FLUORO-9β,11β-OXIDO-16α-METHYL-1,4,6-PREGNATRIENE-17α,21-DIOL-3,20-DIONE 21-ACETATE 6-fluoro-9α-bromo-16α-methyl-6 - dehydroprednisolone 21-acetate, the compound of Example 53B, is reacted with potassium acetate in methanol and the resultant product isolated and purified in the manner described in Example 44A to give 6-fluoro-9β,11β-oxido-16α-methyl-1,4,6-pregnatriene-17α,21-diol-3,20-dione 21-acetate.

B. 6,9α-DIFLUORO-16α-METHYL-6-DEHYDROPREDNISOLONE 21-ACETATE

A solution of 0.1 g. of the 6-fluoro-9β,11β-oxidopregnatriene of Example 54A in 5 ml. of alcohol free chloroform is saturated with anhydrous hydrogen fluoride at 0° C. The mixture is allowed to stand 4 hours at 0° C., then concentrated in vacuo to a residue which is crystallized from acetone-hexane to give 6,9α-difluoro-16α-methyl-6-dehydroprednisolone 21-acetate.

C. 6,9α-DIFLUORO-16α-METHYL-6-DEHYDROPREDNISOLONE

The 21-acetate of Example 54B is hydrolyzed to the corresponding 21-alcohol by means of dilute aqueous sodium hydroxide in the manner of Example 2 to give 6,9α-difluoro-16α-methyl-6-dehydroprednisolone.

Alternatively, 6α,9α-difluoro - 16α - methylprednisolone 21-acetate, prepared as described in co-pending application Serial No. 770,288 of Nussbaum et al., filed October 29, 1958, is reacted with bromine in dioxane in the manner described in Example 25B to give 6-bromo-6,9α-difluoro-16α-methylprednisolone 21-acetate which is reacted with 2,4-lutidine in the manner of Example 22C to give 6,9α-difluoro-16α-methyl-6 - dehydroprednisolone 21-acetate.

A third method of preparing the compound of this example is by subjecting 6,9α-difluoro-16α-methyl-6-dehydrohydrocortisone, the compound of Example 26 to the action of a culture of *Corynebacterium simplex* in the manner described in the third procedure of Example 15 to give 6,9α-difluoro-16α-methyl-6-dehydroprednisolone.

EXAMPLE 55

*6-fluoro-9α-bromo-16β-methyl-6-dehydroprednisolone*

A. 6-FLUORO-16β-METHYL-1,4,6,9(11)-PREGNATETRA-ENE-17α,21-DIOL-3,20-DIONE 21-ACETATE 6-fluoro-16β-methyl-6-dehydroprednisolone 21-acetate, the compound of Example 50B, is reacted with methylenesulfonyl chloride in dimethylformamide and the resultant product isolated and purified in the manner described in Example 28A to give 6-fluoro-16β-methyl-1,4,6,9(11)-pregnatetraene-17α,21-diol-3,20-dione 21-acetate.

B. 6-FLUORO-9α-BROMO-16β-METHYL-6-DEHYDROPREDNISOLONE 21-ACETATE

In the manner described in Example 28B, the 6-fluoropregnatetraene of Example 55A, is reacted with perchloric acid and N-bromoacetamide in t-butyl alcohol and the resultant product isolated and purified to give 6-fluoro-9α-bromo-16β-methyl-6-dehydroprednisolone 21-acetate.

C. 6-FLUORO-9α-BROMO-16β-METHYL-6-DEHYDROPREDNISOLONE

The 21-acetate of Example 55B is hydrolyzed to the corresponding 21-alcohol by means of *Flavobacterium dehydrogenans* in the manner of Example 30I to give 6-fluoro-9α-bromo-16β-methyl-6-dehydroprednisolone.

EXAMPLE 56

*6,9α-difluoro-16β-methyl-6-dehydroprednisolone*

A. 6-FLUORO-9β,11β-OXIDO-16β-METHYL-1,4,6-PREGNATRIENE-17α,21-DIOL-3,20-DIONE 21-ACETATE 6-fluoro-9α-bromo-16β-methyl-6 - dehydroprednisolone 21-acetate, the compounds of Example 55B, is reacted with potassium acetate in the manner described in Example 44A. The resultant product is isolated and purified in the described manner to give 6-fluoro-9β,11β-oxido-16β-methyl-1,4,6-pregnatriene-17α,21-diol-3,20-dione 21-acetate.

B. 6,9α-DIFLUORO-16β-METHYL-6-DEHYDROPREDNISOLONE 21-ACETATE

The oxidopregnatriene of Example 56A is reacted with anhydrous hydrogen fluoride in chloroform in the manner described in Example 54B and the resultant product isolated and purified to give 6,9α-difluoro-16β-methyl-6-dehydroprednisolone 21-acetate.

C. 6,9α-DIFLUORO-16β-METHYL-6-DEHYDROPREDNISOLONE

The 21-acetate of Example 56B is hydrolyzed to the corresponding 21-alcohol by means of dilute aqueous sodium hydroxide in the manner of Example 2 to give 6,9α-difluoro-16β-methyl-6-dehydroprednisolone.

EXAMPLE 57

*6-fluoro-9α-chloro-16β-methyl-6-dehydroprednisolone 21-acetate*

6-fluoro-9β,11β-oxido-16β-methyl - 1,4,6 - pregnatriene-17α,21-diol-3,20-dione 21-acetate, prepared as described in Example 56A, is reacted with anhydrous hydrogen chloride in chloroform in the manner of Example 12B to give 6-fluoro-9α-chloro-16β-methyl-6-dehydroprednisolone 21-acetate.

In a similar fashion, 6-fluoro-9β,11β-oxido-16α-methyl-1,4,6-pregnatriene-17α,21-diol-3,20-dione 21-acetate, the compound of Example 54A, is converted to 6-fluoro-9α-chloro-16α-methyl-6-dehydroprednisolone 21-acetate.

EXAMPLE 58

*6-fluoro-9α-chloro-16β-methyl-6-dehydroprednisolone*

6,9α-difluoro-16α-methyl-6-dehydroprednisolone 21-acetate, the compound of Example 54B, is reacted with chromium trioxide in acetic acid and the resultant product isolated and purified in the manner described in the alternative procedure of Example 18 to give 6,9α-difluoro-16α-methyl-6-dehydroprednisone 21-acetate.

In a similar fashion, the 9α-bromo and 9α-chloro analogs of the compound of this example are prepared from 6-fluoro-9α-bromo-16α-methyl - 6 - dehydroprednisolone 21-acetate, the compound of Example 53B, and 6-fluoro-9α-chloro-16α-methyl-6-dehydroprednisolone 21-acetate, prepared in the manner described in Example 57.

EXAMPLE 59

*6,9α-difluoro-16β-methyl-6-dehydroprednisone 21-acetate*

6,9α-difluoro-16β-methyl-6-dehydroprednisolone 21-acetate, the compound of Example 56B, is reacted with chromium trioxide in acetic acid and the resultant product isolated and purified in the manner described in the alternative procedure of Example 18 to give 6,9α-difluoro-16β-methyl-6-dehydroprednisone 21-acetate.

In a similar fashion, the 9α-bromo and 9α-chloro analogs of the compounds of this example may be prepared by the chromic acid oxidation of 6-fluoro-9α-bromo-16β-methyl-6-dehydroprednisolone 21-acetate, the compound of Example 55B, and 6-fluoro-9α-chloro-16β-methyl-6-dehydroprednisolone 21-acetate, prepared as described in Example 57.

EXAMPLE 60

*6-fluoro-16β-n-butyl-6-dehydroprednisone*

A. 6-BROMO-6-FLUORO-16β-n-BUTYLPREDNISONE 21-ACETATE

The requisite intermediate, 6α-fluoro-16β-n-butylprednisone 21-acetate, is prepared in the manner described in co-pending application Serial No. 770,288 of Nussbaum et al., filed October 29, 1958.

6α - fluoro - 16β - n - butylprednisone 21 - acetate is reacted with N-bromo-succinimide under an atmosphere of nitrogen and the resultant product isolated and purified in the manner described in Example 22B to give 6-bromo-6-fluoro-16β-n-butylprednisone 21-acetate.

B. 6-FLUORO-16β-n-BUTYL-6-DEHYDROPREDNISONE 21-ACETATE

The 6 - bromo - 6 - fluoro - 16β - n - butylprednisone 21-acetate of Example 60A is reacted with 2,4-lutidine and the resultant product isolated and purified in the manner described in Example 22C to give 6-fluoro-16β-n-butyl-6-dehydroprednisone 21-acetone.

C. 6-FLUORO-16β-n-BUTYL-6-DEHYDROPREDNISONE

The 21-acetate of Example 60B is hydrolyzed to the corresponding 21-alcohol by means of dilute aqueous sodium hydroxide in the manner described in Example 2 to give 6-fluoro-16β-n-butyl-6-dehydroprednisone.

EXAMPLE 61

*6-bromo-16α-methyl-6-dehydroprednisolone*

A. 16α-METHYLPREDNISOLONE TRIACETATE

The requisite intermediate, 16α-methylprednisolone 21-acetate, is prepared in the manner described in co-pending application Serial No. 733,843 of Rausser et al., filed May 8, 1958, now U.S. Patent No. 3,164,618.

16α-methylprednisolone 21-acetate is reacted with acetic acid and trifluoroacetic anhydride in the manner of Example 30D to give 16α-methylprednisolone triacetate.

B. 6-BROMO-16α-METHYLPREDNISOLONE TRIACETATE

The triacetate of Example 61A is reacted with N-bromosuccinimide in carbon tetrachloride under an atmosphere of nitrogen and the resultant product isolated and purified in the manner described in Example 8A to give 6-bromo-16α-methylprednisolone triacetate.

C. 16α-METHYL-6-DEHYDROPREDNISOLONE TRIACETATE

The 6-bromo compound of Example 61B is reacted with 2,4-lutidine and the resultant product isolated and purified in the manner described in Example 8A to give 16α-methyl-6-dehydroprednisolone triacetate.

D. 6,7-DIBROMO-16α-METHYLPREDNISOLONE TRIACETATE

16α-methyl-6-dehydroprednisolone triacetate, the compound of Example 61C is brominated in the manner of Example 1 to give 6,7-dibromo-16α-methylprednisolone triacetate.

E. 6-BROMO-16α-METHYL-6-DEHYDROPREDNISOLONE TRIACETATE

In the manner described in Example 1, the 6,7-dibromide of Example 61D is reacted with 2,4-lutidine and the resultant product isolated and purified to give 6-bromo-16α-methyl-6-dehydroprednisolone triacetate.

F. 6-BROMO-16α-METHYL-6-DEHYDROPREDNISOLONE

The triacetate of Example 61E is hydrolyzed to the corresponding alcohol with the aid of a culture of *Flavobacterium dehydrogenans* and the resultant product isolated and purified in the manner described in Example 30I to give 6-bromo-16α-methyl-6-dehydroprednisolone.

Alternatively, the compound of this example is prepared from 6-bromo-16α-methyl-6-dehydrohydrocortisone, the compound of Example 38, with the aid of a culture of *Corynebacterium simplex* in the manner described in the third procedure of Example 15 and the resultant product isolated and purified to give 6-bromo-16α-methyl-6-dehydroprednisolone.

EXAMPLE 62

*6,9α-dibromo-16α-methyl-6-dehydroprednisolone*

A. 6-BROMO-16α-METHYL-6-DEHYDROPREDNISOLONE 21-ACETATE 6-bromo-16α-methyl-6-dehydroprednisolone, prepared as described in Example 61, is reacted with acetic anhydride in pyridine in the manner described in Example 41 to give 6-bromo-16α-methyl-6-dehydroprednisolone 21-acetate.

B. 6-BROMO-16α-METHYL-1,4,6,9(11)-PREGNATETRAENE-17α,21-DIOL-3,20-DIONE 21-ACETATE

In the manner described in Example 28A, 6-bromo-16α-methyl-6-dehydroprednisolone 21-acetate, the compound of Example 62A, is reacted with methylenesulfonylchloride in dimethylformamide and the resultant product isolated and purified to give 6-bromo-16α-methyl-1,4,6,9(11)-pregnatetraene-17α,21-diol-3,20-dione 21-acetate.

C. 6,9α-DIBROMO-16α-METHYL-6-DEHYDROPREDNISOLONE 21-ACETATE

The 6-bromopregnatetraene of Example 62B is reacted with N-bromo-acetamide and perchloric acid and the resultant product isolated and purified in the manner described in Example 43B to give 6,9α-dibromo-16α-methyl-6-dehydroprednisolone 21-acetate.

D. 6,9α-DIBROMO-16α-METHYL-6-DEHYDROPREDNISOLONE

The 21-acetate of Example 62C is hydrolyzed to the corresponding 21-alcohol by means of methanolic perchloric acid in the manner of Example 21D to give 6,9α-dibromo-16α-methyl-6-dehydroprednisolone.

Alternatively, the compound of this example may be prepared by the following procedures, E, F, G, H, I, and J.

E. 9β,11β-OXIDO-16α-METHYL-1,4-PREGNADIENE-17α,21-DIOL-3,20-DIONE 21-ACETATE

The requisite intermediate, 9α-bromo-16α-methylprednisolone 21-acetate, is prepared in the manner described in co-pending application Serial No. 733,843 of Rausser et al., filed May 8, 1958, now U.S. Patent No. 3,164,618.

9α-bromo-16α-methylprednisolone 21-acetate is reacted with potassium acetate in methanol in the manner described in Example 44A. The resultant product is isolated and purified in the described manner to give 9β,11β-oxido-16α-methyl-1,4-pregnadiene-17α,21 - diol-3,20-dione 21-acetate.

F. 6-BROMO-9β,11β-OXIDO-16α-METHYL-1,4-PREGNADIENE-17α,21-DIOL-3,20-DIONE 21-ACETATE

In the manner described in Example 8A, the 9β,11β-oxido of Example 62E is reacted with N-bromosuccinimide under an atmosphere of nitrogen and the resultant product isolated and purified to give 6-bromo-9β,11β-oxido-16α-methyl-1,4-pregnadiene-17α,21-diol - 3,20 - dione 21-acetate.

G. 9β,11β-OXIDO-16α-METHYL-1,4,6-PREGNATRIENE-17α,21-DIOL-3,20-DIONE 21-ACETATE

In the manner described in Example 8A, the 6-bromo-9β,11β-oxido-pregnadiene of Example 62F is reacted with 2,4-lutidine and the resultant product isolated and purified to give 9β,11β-oxido-16α-methyl-1,4,6-pregnatriene-17α,21-diol-3,20-dione 21-acetate.

H. 6,7-DIBROMO-9β,11β-OXIDO-16αMETHYL-1,4-PREGNADIENE-17α,21-DIOL-3,20-DIONE 21-ACETATE

The 9β,11β-oxidopregnatriene of Example 62G is brominated in the manner described in Example 1 to give 6,7-dibromo-9β,11β-oxido-16α-methyl - 1,4 - pregnadiene-17α,21-diol-3,20-dione 21-acetate.

I. 6-BROMO-9β,11β-OXIDO-16α-METHYL-1,4,6-PREGNATRIENE-17α,21-DIOL-3,20-DIONE 21-ACETATE

The 6,7-dibromo of Example 62H is reacted with 2,4-lutidine and the resultant product isolated and purified in the manner of Example 1 to give 6-bromo-9β,11β-oxido-16α-methyl-1,4,6-pregnatriene - 17α,21 - diol - 3,20-dione 21-acetate.

J. 6,9α-DIBROMO-16α-METHYL-6-DEHYDROPREDNISOLONE 21-ACETATE

The 6-bromo-9β,11β-oxidopregnatriene of Example 62I is dissolved in carbon tetrachloride and reacted with hydrobromic acid in acetic acid in the manner of Example 11C. The resultant product is isolated and purified in the described manner to give 6,9α-dibromo-16α-methyl-6-dehydroprednisolone 21-acetate.

EXAMPLE 63

*6-bromo-9α-fluoro-16α-methyl-6-dehydroprednisolone 21-acetate*

6-bromo-9β,11β-oxido-16α-methyl-1,4,6 - pregnatriene-17α,21-diol-3,20-dione, the compound of Example 62I, is reacted with anhydrous hydrogen fluoride in chloroform and the resultant product isolated and purified in the manner described in Example 54B to give 6-bromo-9α-fluoro-16α-methyl-6-dehydroprednisolone 21-acetate.

EXAMPLE 64

*6-chloro-16α-methyl-6-dehydroprednisolone*

A. 5α,6α-OXIDO-16α-METHYL-1-PREGNENE-11β,17α,21-TRIOL-3,20-DIONE 21-ACETATE

The requisite intermediate, 16α-methyl-1,5-pregnadiene-11β,17α,21-triol-3,20-dione 21-acetate, is prepared in the manner described in co-pending application Serial No. 770,315 of Nussbaum et al. filed October 29, 1958, now U.S. Patent No. 3,013,033.

A solution of 16α-methyl-1,5-pregnadiene-11β,17α,21-triol-3,20-dione 21-acetate in benzene is reacted with a solution of peracetic acid and sodium acetate, and the resultant product isolated and purified in the manner described in Example 23A to give 5α,6α-oxido-16α-methyl-1-pregnene-11β,17α,21-triol-3,20-dione 21-acetate.

B. 6α-CHLORO-16α-METHYLPREDNISOLONE 21-ACETATE

The 5α,6α-oxido of Example 64A is reacted with a solution of anhydrous hydrogen chloride in chloroform and the resultant product isolated and purified in the manner described in Example 23B to give 6α-chloro-16α-methylprednisolone 21-acetate.

C. 6-BROMO-6-CHLORO-16α-METHYLPREDNISOLONE 21-ACETATE

The 6-chloro-16α-methylprednisolone 21-acetate of Example 64B is reacted with bromine in dioxane and the resultant product isolated and purified in the manner described in Example 25B to give 6-bromo-6-chloro-16α-methylprednisolone 21-acetate.

D. 6-CHLORO-16α-METHYL-6-DEHYDROPREDNISOLONE 21-ACETATE

In a manner similar to that described in Example 22C, 6-bromo-6-chloro-16α-methyl-6-dehydroprednisolone 21-acetate, of Example 64C, is reacted with 2,4-lutidine and the resultant product isolated and purified to give 6-chloro-16α-methyl-6-dehydroprednisolone 21-acetate.

E. 6-CHLORO-16α-METHYL-6-DEHYDROPREDNISOLONE

The 21-acetate of Example 64D is hydrolyzed to the corresponding 21-alcohol by means of dilute aqueous sodium hydroxide in the manner of Example 2 to give 6-chloro-16α-methyl-6-dehydroprednisolone.

EXAMPLE 65

*6,9α-dibromo-16α-methyl-6-dehydroprednisone 21-acetate*

6,9α-dibromo-16α-methyl-6-dehydroprednisolone 21-acetate, the compound of Example 62C, is reacted with chromium trioxide in acetic acid and the resultant product isolated and purified in the manner described in the alternative procedure of Example 18 to give 6,9α-dibromo-16α-methyl-6-dehydroprednisone 21-acetate.

In like manner, the 16α-methyl-11-hydroxy compounds of Examples 61, 63 and 64 are converted to the corresponding 11-keto compounds when oxidized by means of chromium trioxide in acetic acid.

EXAMPLE 66

*6,9α-dibromo-16β-methyl-6-dehydroprednisolone 21-acetate*

6,9α-dibromo-16β-methyl-6-dehydrohydrocortisone 21-acetate, prepared as described in Example 43C, is subjected to an action of a culture of *Corynebacterium simplex* and the resultant product isolated and purified in the manner similar to that described in the third procedure of Example 15 to give 6,9α-dibromo-16β-methyl-6-dehydroprednisolone 21-acetate.

EXAMPLE 67

*6-bromo-9α-fluoro-16β-methyl-6-dehydroprednisolone 21-acetate*

6-bromo-9α-fluoro-16β-methyl - 6 - dehydrohydrocortisone 21-acetate, prepared as described in Example 9, is subjected to the action of a culture of *Corynebacterium simplex* and the resultant product isolated and purified in the manner of the third procedure of Example 15 to give 6-bromo-9α-fluoro-16β-methyl - 6 - dehydroprednisolone 21-acetate.

EXAMPLE 68

*6-bromo-9α-fluoro-16β-methyl-6-dehydroprednisone 21-acetate*

6-bromo-9α-fluoro-16β-methyl-6 - dehydroprednisolone 21-acetate, the compound of Example 67, is reacted with chromium trioxide in acetic acid and the resultant product isolated and purified in the manner described in the alternative procedure of Example 18 to give 6-bromo-9α-fluoro-16β-methyl-6-dehydroprednisone 21-acetate.

In a similar manner, the 9α-bromo analog of the compound of this example is prepared from 6,9α-dibromo-16β-methyl-6-dehydroprednisolone 21-acetate, the compound of Example 66 when reacted with chromium trioxide in acetic acid.

EXAMPLE 69

*6-bromo-9α-fluoro-16β-methyl-6-dehydroprednisone*

The 21-acetate of Example 68 is hydrolyzed to the corresponding 21-alcohol in chloroform methanol by means of dilute aqueous sodium hydroxide in the manner described in Example 2 to give 6-bromo-9α-fluoro-16β-methyl-6-dehydroprednisone.

In a similar manner, 6,9α-dibromo-16β-methyl-6-dehydroprednisone 21-acetate, prepared as described in Example 68, is hydrolyzed to give 6,9α-dibromo-16β-methyl-6-dehydroprednisone.

EXAMPLE 70

*6,9α-difluoro-16α-methyl-6-dehydroprednisone*

6,9α-difluoro-16α-methyl-6-dehydroprednisone 21-acetate, prepared as described in Example 58, is hydrolyzed to the corresponding 21-alcohol by means of dilute aqueous sodium hydroxide in methanol-chloroform in the manner described in Example 2 to give 6,9α-difluoro-16α-methyl-6-dehydroprednisone.

In a similar fashion, 6-fluoro-9α-bromo-16α-methyl-6-dehydroprednisone 21-acetate and 6-fluoro-9α-chloro-16α-methyl-6-dehydroprednisone 21-acetate, prepared according to the procedure of Example 58, are hydrolyzed to their corresponding 21-alcohols, 6-fluoro-9α-bromo-16α-methyl-6-dehydroprednisone and 6-fluoro-9α-chloro-16α-methyl-6-dehydroprednisone, respectively.

EXAMPLE 71

*6,9α-difluoro-16β-methyl-6-dehydroprednisone*

6,9α-difluoro-16β-methyl-6-dehydroprednisone 21-acetate, the compound of Example 59, is hydrolyzed to the corresponding 21-alcohol by means of dilute aqueous sodium hydroxide in methanol-chloroform in the manner described in Example 2 to give 6,9α-difluoro-16β-methyl-6-dehydroprednisone.

In a similar fashion, 6-fluoro-9α-bromo-16β-methyl-6-dehydroprednisone 21-acetate and 6-fluoro-9α-chloro-16β-methyl-6-dehydroprednisone 21-acetate, prepared in the manner of Example 59, is hydrolyzed to their corresponding 21-alcohols, 6-fluoro-9α-bromo-16β-methyl-6-dehydroprednisone and 6-fluoro-9α-chloro-16β-methyl-6-dehydroprednisone, respectively.

EXAMPLE 72

*6-bromo-16α-methyl-6-dehydroprednisone*

6-bromo-16α-methyl-6-dehydroprednisolone 21-acetate, prepared as described in Example 62A, is reacted with chromium trioxide in acetic acid and the resultant product isolated and purified in the manner described in the alternative procedure of Example 18 to give 6-bromo-16α-methyl-6-dehydroprednisone 21-acetate.

The 21-acetate prepared above is hydrolyzed to the corresponding 21-alcohol by means of dilute aqueous sodium hydroxide in the manner described in Example 2 to give 6-bromo-16α-methyl-6-dehydroprednisone.

EXAMPLE 73

6-fluoro-9α-bromo-6-dehydroprednisone 6-fluoro-9α-bromo-6-hydroprednisolone 21-acetate, the compound of Example 28B, is reacted with chromium trioxide in acetic acid in the manner described in the alternative procedure of Example 18 to give 6-fluoro-9α-bromo-6-dehydroprednisone 21-acetate.

The 21-acetate prepared above is hydrolyzed to the corresponding 21-alcohol by means of methanolic perchloric acid in the manner of Example 21D to give 6-fluoro-9α-bromo-6-dehydroprednisone.

EXAMPLE 74

6,9α-dibromo-6-dehydroprednisone 6,9α-dibromo-6-dehydroprednisolone 21-acetate, the compound of Example 21C, is reacted with chromium trioxide in acetic acid and the resultant product isolated and purified in the manner described in the alternative procedure of Example 18 to give 6,9α-dibromo-6-dehydroprednisone 21-acetate.

The 21-acetate prepared above is hydrolyzed to the corresponding 21-alcohol by means of methanolic perchloric acid in the manner of Example 21D to give 6,9α-dibromo-6-dehydroprednisone.

EXAMPLE 75

6-bromo-9α-fluoro-6-dehydrocortisone 6-bromo-9α-fluoro-6-dehydrohydrocortisone 21-acetate, the compound of Example 9, is reacted with chromium trioxide in acetic acid and the resultant product isolated and purified in the manner described in the alternative procedure of Example 18 to give 6-bromo-9α-fluoro-6-dehydrocortisone 21-acetate.

The 21-acetate prepared above is hydrolyzed to the corresponding 21-alcohol by means of dilute aqueous sodium hydroxide in the manner described in Example 2 to give 6-bromo-9α-fluoro-6-dehydrocortisone.

EXAMPLE 76

6-fluoro-6-dehydrohydrocortisone

A. 6α-FLUOROHYDROCORTISONE 21-ACETATE

6α-fluorohydrocortisone is reacted with acetic anhydride in pyridine and the resultant product isolated and purified in the manner described in Example 22A to give 6α-fluorohydrocortisone 21-acetate.

B. 6-BROMO-6-FLUOROHYDROCORTISONE 21-ACETATE

6α-fluorohydrocortisone 21-acetate, the compound of Example 76A, is reacted with bromine in dioxane under nitrogen in the manner of Example 25B. The resultant product is isolated and purified in the described manner to give 6-bromo-6-fluorohydrocortisone 21-acetate.

C. 6-FLUORO-6-DEHYDROHYDROCORTISONE 21-ACETATE

The 6-bromo-6-fluorohydrocortisone 21-acetate of Example 76B is reacted with 2,4-lutidine under nitrogen and the resultant product isolated and purified in the manner described in Example 22C to give 6-fluoro-6-dehydrohydrocortisone 21-acetate.

D. 6-FLUORO-6-DEHYDROHYDROCORTISONE

The 21-acetate of Example 76C is hydrolyzed to the corresponding 21-alcohol with 1:2 chloroform-methanol with dilute aqueous sodium hydroxide in the manner described in Example 2 to give 6-fluoro-6-dehydrohydrocortisone.

EXAMPLE 77

6-fluoro-9α-bromo-6-dehydrohydrocortisone

A. 6-FLUORO-4,6,9(11)-PREGNATRIENE-17α,21-DIOL-3,20-DIONE 21-ACETATE

Five grams of 6-fluoro-6-dehydrohydrocortisone 21-acetate is reacted with methylenesulfonyl chloride in dimethylformamide in the presence of dry pyridine and the resultant product isolated and purified in the manner described in Example 28A to give 6-fluoro-4,6,9(11)-pregnatriene-17α,21-diol-3,20-dione 21-acetate.

B. 6-FLUORO-9α-BROMO-6-DEHYDROHYDROCORTISONE 21-ACETATE

In the manner described in Example 43B, the 6-fluoropregnatriene of Example 77A is reacted with bromoacetamide and perchloric acid in t-butyl alcohol and the resultant product isolated and purified to give 6-fluoro-9α-bromo-6-dehydrohydrocortisone 21-acetate.

C. 6-FLUORO-9α-BROMO-6-DEHYDROHYDROCORTISONE

The 21-acetate of Example 77B is hydrolyzed to the corresponding 21-alcohol with methanolic perchloric acid in the manner of Example 21D to give 6-fluoro-9α-bromo-6-dehydrohydrocortisone.

EXAMPLE 78

6-fluoro-9α-chloro-6-dehydrohydrocortisone

A. 6-FLUORO-9β,11β-OXIDO-4,6-PREGNADIENE-17α,21-DIOL-3,20-DIONE 21-ACETATE 6-fluoro-9α-bromo-6-dehydrohydrocortisone 21-acetate, the compound of Example 77A, is reacted with potassium acetate in methanol and the resultant product isolated and purified in the manner described in Example 44A to give 6-fluoro-9β,11β-oxido-4,6-pregnadiene-17α,21-diol-3,20-dione 21-acetate.

B. 6-BROMO-9α-CHLORO-6-DEHYDROHYDROCORTISONE 21-ACETATE

The 6-fluoro-9,11-epoxypregnadiene of Example 78A is reacted with a solution of hydrogen chloride in chloroform and the resultant product isolated and purified in the manner described in Example 12B to give 6-bromo-9α-chloro-6-dehydrohydrocortisone 21-acetate.

C. 6-FLUORO-9α-CHLORO-6-DEHYDROHYDROCORTISONE

The 21-acetate of Example 78B is hydrolyzed to the corresponding 21-alcohol by means of methanolic perchloric acid in the manner of Example 21D to give 6-fluoro-9α-chloro-6-dehydrohydrocortisone.

EXAMPLE 79

6-fluoro-9α-bromo-6-dehydrocortisone 6-fluoro-9α-bromo-6-dehydrohydrocortisone 21-acetate, the compound of Example 77B, is reacted with chromium trioxide in acetic acid in the manner described in the alternative procedure of Example 18. The resultant product is isolated and purified in the described manner to give 6-fluoro-9α-bromo-6-dehydrocortisone 21-acetate.

The 21-acetate prepared above is hydrolyzed to the corresponding 21-alcohol by means of a culture of *Flavobacterium dehydrogenans* in the manner described in Example 30I to give 6-fluoro-9α-bromo-6-dehydrocortisone.

EXAMPLE 80

6-fluoro-9α-bromo-6-dehydrocortisone 6-fluoro-9α-chloro-6-dehydrohydrocortisone 21-acetate, the compound of Example 78B is reacted with chromium trioxide in acetic acid in the manner described in the alternative procedure of Example 18. The resultant product is isolated and purified in the described manner to give 6-fluoro-9α-chloro-6-dehydrocortisone 21acetate.

The 21-acetate prepared above is hydrolyzed to the corresponding 21-alcohol by means of a culture of

*Flavobacterium dehydrogenans* in the manner of Example 30I to give 6-fluoro-9α-chloro-6-dehydrocortisone.

We claim:

1. Compounds of the group consisting of 6,6-dihalogeno-1,4-pregnadienes of the following formula and the 1,2-dihydro analogs thereof:

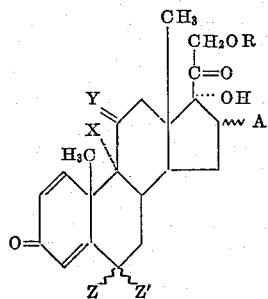

wherein X is a member of the group consisting of H and halogen of atomic weight less than 126; Y is a member of the group consisting of O and (H, βOH); Z and Z′ are halogens of atomic weight less than 126; A is a member of the group consisting of H and lower alkyl; and R is a member of the group consisting of hydrogen and the acyl radical of a hydrocarbon carboxylic acid containing from 1 to 12 carbon atoms, inclusive.

2. A compound of claim 1 wherein X is H, Y is (H, βOH), Z in bromo, Z′ is fluoro, R is lower alkanoyl and A is a member of the group consisting of H and methyl.

3. A compound of claim 1, wherein X is H, Y is O, Z is bromo, Z′ is fluoro, R is lower alkanoyl and A is a member of the group consisting of H and methyl.

4. A compound of claim 1, wherein X is F, Y is (H, βOH), Z is bromo, Z′ is fluoro, R is lower alkanoyl and A is a member of the group consisting of H and methyl.

5. A 1-dehydro compound of claim 1 wherein X is H, Y is (H, βOH), Z is bromo, Z′ is chloro, A is H and R is acetyl, said compound being 6-chloro-6-bromo-prednisolone 21-acetate.

6. A 1-dehydro compound of claim 1 wherein X is H, Y is (H, βOH), Z is bromo, Z′ is chloro, A is α-methyl and R is acetyl, said compound being 6-chloro-6-bromo-16α-methyl-prednisolone 21-acetate.

7. A 1-dehydro compound of claim 1 wherein X is F, Y is (H, βOH), Z is bromo, Z′ is fluoro, A is H and R is acetyl, said compound being 6-fluoro-6-bromo-prednisolone acetate.

8. A 1,2-dihydro compound of claim 1 wherein X is F, Y is (H, βOH), Z is bromo, Z′ is fluoro, A is methyl and R is acetyl, said compound being 6-fluoro-6-bromo-9α-fluoro-16-methyl-prednisolone 21-acetate.

9. A compound of the group consisting of 6-bromo-4,6-pregnadienes of the following formula, and the 1-dehydro analogs thereof

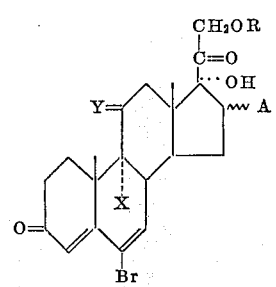

wherein X is a member of the group consisting of H and halogen, Y is a member of the group consisting of O and (H, βOH), A is a member of the group consisting of H and methyl and R is a member of the group consisting of H and lower alkanoyl.

10. A compound of claim 9 wherein X is fluoro, Y is (H, βOH), A is H and R is lower alkanoyl.

11. A compound of claim 9 wherein X is fluoro, Y is (H, βOH), A is methyl and R is lower alkanoyl.

12. A compound of claim 9 wherein X is H, Y is (H, βOH), A is H and R is lower alkanoyl.

13. In the process of preparing compounds of the group consisting of pregnatrienes of the following formula:

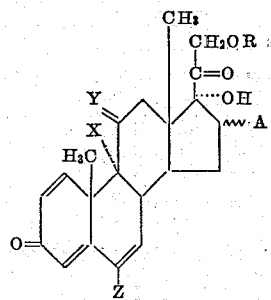

wherein X is a member of the group consisting of H and halogen of atomic weight less than 126; Y is a member of the group consisting of O and (H, βOR); Z is a halogen of atomic weight less than 126; A is a member of the group consisting of H and lower alkyl; and R is a member of the group consisting of H and lower alkanoyl; and the 1,2-dihydro analogs thereof; the steps which comprise halogenating a compound of the formula:

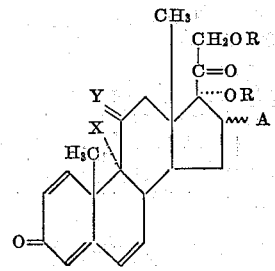

wherein A, X, Y, and R are as above defined, and the 1,2-dihydro analogs thereof whereby there is formed a 6,7-dihalogeno intermediate, and dehydrohalogenating said intermediate by means of an organic base.

14. The process of claim 13 wherein 6-dehydrocortisone 21-acetate is brominated to yield the intermediate 6,7-dibromocortisone 21-acetate and said intermediate is dehydrobrominated by means of 2,4-lutidine, and the resulting 6-bromo-6-dehydrocortisone 21-acetate thereby formed is isolated.

15. The process of claim 13 wherein 6-dehydrohydrocortisone 21-acetate is brominated to give the intermediate 6,7-dibromohydrocortisone 21-acetate, and said intermediate is dehydrobrominated by means of dimethylformamide, and the 6-bromo-6-dehydrohydrocortisone thereby formed is isolated.

16. The process of claim 13 wherein 9α-fluoro-6-dehydrohydrocortisone 21-acetate is brominated by means of hydrogen bromide and bromine to give the intermediate, 6,7-dibromo-6-dehydrohydrocortisone 21-acetate, and said intermediate is dehydrobrominated by means of lutidine and the 6-bromo-9α-fluoro-6-dehydrohydrocortisone 21-acetate thereby formed is isolated.

17. The process of preparing compounds of the group consisting of pregnatrienes of the following formula, and the 1,2-dihydro analogs thereof:

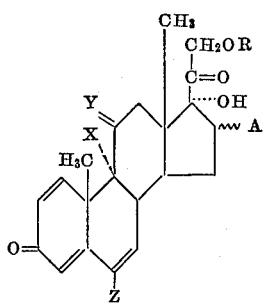

wherein X is a member of the group consisting of H and halogen of atomic weight less than 126; Y is a member of the group consisting of O and (H, βOH); Z is a halogen of atomic weight less than 126; A is a member of the group consisting of H and lower alkyl; and R is a member of the group consisting of H and lower alkanoyl; the steps which comprise brominating a compound of the group consisting of pregnadienes of the following formula, and the 1,2-dihydro analogs thereof:

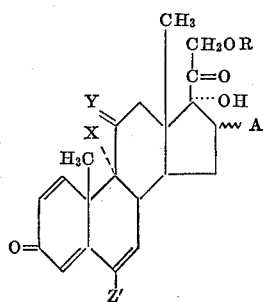

wherein A, R, X and Y are as above defined, and Z' is a halogen having an atomic weight less than 36, with a brominating agent selected from the group consisting of bromine and an N-bromoamide of a saturated hydrocarbon carboxylic acid having up to 4 carbon atoms to form the corresponding 6-bromo intermediate, and dehydrobrominating said 6-bromo intermediate with a base to form the 6-dehydro analog.

18. The process according to claim 17 wherein a compound of the group consisting of pregnadienes of the following formula, and the 1,2-dihydro analogs thereof:

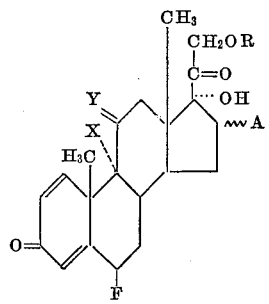

wherein A, R, X and Y are as defined in claim 17; is brominated with a member of the group consisting of bromine and an N-bromoamide of a lower alkanoic acid and the 6-bromo-6-fluoro intermediate thereby formed is dehydrobrominated with a base to form the 6-dehydro analog.

19. The process of claim 18 comprising brominating 6,9α-difluoro-16-methylprednisolone 21-acetate with bromine thus forming the corresponding 6-bromo-6-fluoro 21-acetate intermediate, and dehydrobrominating said intermediate by reaction with lutidine, whereby there is produced 6,9α-difluoro-16-methyl-6-dehydroprednisolone 21-acetate.

20. The process of claim 18 comprising brominating 6,9α-difluoro-16-methylhydrocortisone 21-acetate with bromine thus forming the corresponding 6-bromo-6-fluoro 21-acetate intermediate, and dehydrobrominating said intermediate by means of lutidine whereby there is produced 6,9α - difluoro-16-methyl-6-dehydrohydrocortisone 21-acetate.

21. A 1,2-dihydro compound of claim 9, wherein X is hydrogen, Y is O, A is hydrogen and R is acetyl; said compound being 6-bromo-4,6-pregnadiene-17α,21-diol-3,11,20-trione 21-acetate.

References Cited by the Examiner
UNITED STATES PATENTS 2,814,631  11/1957  Gould _____ 260—397.45
2,819,264  1/1958  Gould et al. _____ 260—239.45

LEWIS GOTTS, *Primary Examiner.*

B. E. LANHAM, LESLIE H. GASTON, MORRIS LIEBMAN, *Examiners.*

IRVING MARCUS, ELBERT LEE ROBERTS, T. J. MORGAN, *Assistant Examiners.*